US006961152B1

(12) United States Patent
Watanabe et al.

(10) Patent No.: US 6,961,152 B1
(45) Date of Patent: Nov. 1, 2005

(54) MULTI-FUNCTIONAL DEVICE HAVING VERTICALLY ARRANGED SCANNER AND PRINTER SECTIONS

(75) Inventors: Yasunori Watanabe, Nagoya (JP); Hideki Yamamoto, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/226,107

(22) Filed: Jan. 7, 1999

(30) Foreign Application Priority Data

| Jan. 8, 1998 | (JP) | ................................. 10-002582 |
| Jan. 8, 1998 | (JP) | ................................. 10-002584 |
| Jan. 8, 1998 | (JP) | ................................. 10-002585 |
| Jun. 15, 1998 | (JP) | ................................. 10-166507 |
| Dec. 7, 1998 | (JP) | ................................. 10-340465 |

(51) Int. Cl.[7] .............................................. H04N 1/23
(52) U.S. Cl. ...................... 358/296; 358/400; 358/401; 358/501
(58) Field of Search .................... 358/400, 1.1, 1.3, 358/501, 401, 502, 468, 434, 296

(56) References Cited

U.S. PATENT DOCUMENTS

| 5,274,477 A | | 12/1993 | Mori et al. .................. 358/498 |
| 5,276,536 A | * | 1/1994 | Hokamura .................... 358/498 |
| 5,329,373 A | * | 7/1994 | Hayashi et al. .............. 358/296 |
| 5,359,435 A | * | 10/1994 | Hayashi et al. .............. 358/498 |
| 5,454,651 A | * | 10/1995 | Tateyama .................... 400/323 |
| 5,523,848 A | * | 6/1996 | Musso et al. ................ 358/296 |
| 5,642,140 A | * | 6/1997 | Sawano et al. .......... 346/139 R |
| 5,697,603 A | * | 12/1997 | Kato .......................... 271/114 |
| 5,719,686 A | * | 2/1998 | Sakamoto et al. ........... 358/444 |
| 5,738,455 A | * | 4/1998 | Umeda ....................... 400/636 |
| 5,790,922 A | * | 8/1998 | Takano ....................... 399/94 |
| 5,826,133 A | * | 10/1998 | Saito et al. ................... 399/2 |
| 5,860,044 A | * | 1/1999 | Eki et al. .................... 399/125 |
| 5,884,117 A | * | 3/1999 | Tanoue et al. ................ 399/1 |
| 6,078,765 A | * | 6/2000 | Takano et al. .............. 399/124 |
| 6,115,564 A | * | 9/2000 | Morimoto .................... 399/92 |
| 6,195,170 B1 | * | 2/2001 | Mizutani et al. ........... 358/1.14 |
| 6,247,778 B1 | * | 6/2001 | Iwata ......................... 347/16 |

FOREIGN PATENT DOCUMENTS

| JP | A 2-228165 | 9/1990 |
| JP | A 9-214658 | 8/1997 |
| JP | A 9-309646 | 12/1997 |
| JP | A 11-88572 | 3/1999 |
| JP | A 11-146112 | 5/1999 |

* cited by examiner

*Primary Examiner*—Joseph R. Pokrzywa
(74) *Attorney, Agent, or Firm*—Oliff & Berridge, PLC

(57) ABSTRACT

A multi-functional device having a printer function, facsimile function, scanner function, and copying function houses a recording section for recording images on a recording medium and a reading section for reading images from a document. A shaft is supported between left and right covers of an outer casing. The reading section is disposed above the shaft and rotatable about the shaft to separate from the recording section. Thus, a space is provided above the recording section and the replacement of an ink cartridge in the recording section can be easily performed.

33 Claims, 19 Drawing Sheets

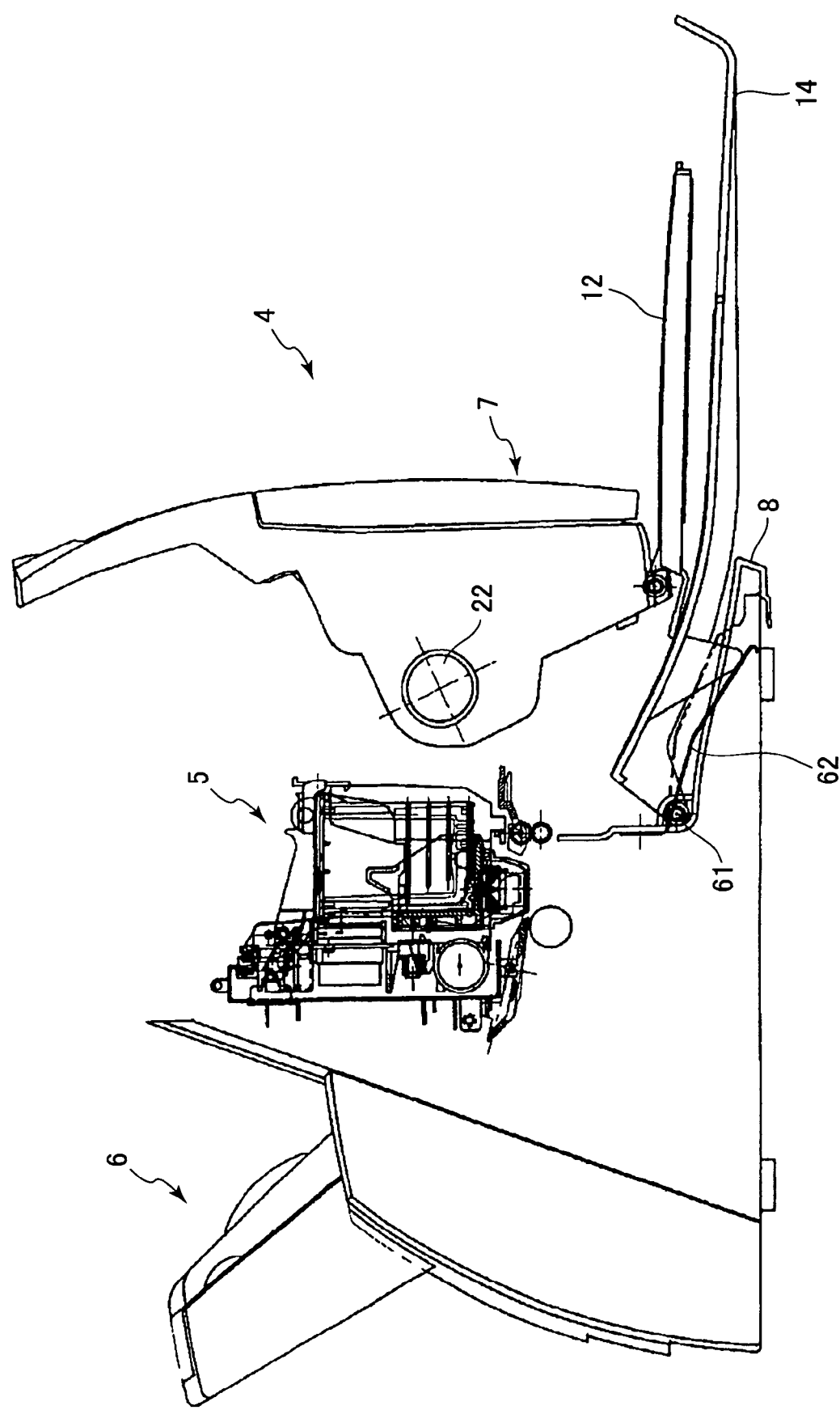

MULTI-FUNCTIONAL DEVICE HAVING VERTICALLY ARRANGED SCANNER AND PRINTER SECTIONS

BACKGROUND OF THE INVENTION

1. Field of the Invention

The present invention relates to a multi-functional device having a printer function, facsimile function, scanner function and copying function, and more particularly to such a device constructed with an outer casing that can be opened to perform such operations as replacing the ink cartridge in the recording section.

2. Description of the Related Art

Devices having multiple functions, such as those of a printer, facsimile, image scanner, and copier, are known in the art. FIG. 1 shows an external view of this type of device. FIG. 2 is a cross-sectional view showing the basic inner construction of such a device.

This multi-functional device 200 includes an image reading unit 4 for reading images from a document; a recording section 5 for recording images on a recording medium; a recording paper cassette 6 mounted on the back portion of the device 200 for maintaining recording paper to be supplied to the recording section 5; a control panel 7 disposed on the top surface of the image reading unit 4; and a document support portion 9 disposed on the back portion of the image reading unit 4 for supporting facsimile or copy originals. The document support portion 9 is capable of rotating in the direction from the front of the device toward the back of the device to open a space above the recording section 5.

In addition, a document discharge portion 10 is provided on the front surface of the device 200. A document discharge tray 12 is disposed on the document discharge portion 10. A recording paper discharge portion 13 is disposed on the lower portion of the document discharge portion 10. A recording paper discharge tray 14 is mounted on the recording paper discharge portion 13. With a multi-functional device 200 of this construction, operations such as replacing the ink cartridge in the recording section 5 can be performed by rotating the document support portion 9 to open a space above the recording section 5, allowing access to the ink cartridge from above.

When rotating the document support portion 9 to open a space above the recording section 5 with a multi-functional device 200 of this construction, however, in order to create sufficient space for the ink cartridge replacement operation, the image reading unit 4 must be provided separately from the recording section 5, and nothing can be positioned above the recording section 5. Hence, the depth of the device must inevitably be a large dimension.

SUMMARY OF THE INVENTION

In view of the foregoing, it is an object of the present invention to provide a multi-functional device in which a space can be formed above the recording section without requiring a large depth dimension and capable of opening sufficient space for performing the ink cartridge replacement operation.

To achieve the above and other objects, there is provided a multi-functional device including an outer casing, a shaft supported on the outer casing, a recording section for recording images on a recording medium, and a reading section for reading images from a document wherein the reading section is disposed above the shaft and rotatable about the shaft to separate from the recording section, whereby a space is provided above the recording section. With this construction, the device can be made compact by arranging the recording section and reading section adjacent to each other. Moreover, space necessary for performing such operations as maintenance on the recording section can be achieved by rotating the reading section away from the recording section.

The reading section is disposed closer to the front side of the outer casing than the recording section and is rotatable toward the front side of the outer casing. The recording section is not positioned in the rotational path of the reading section and, therefore, does not hinder the rotating operation of the reading section. Hence, the reading section can be rotated smoothly away from the recording section.

The shaft is disposed adjacent to the recording section and disposed nearer the front side of the outer casing than the recording section. Therefore, a compact construction of the multi-functional device is enabled and the rotational radius of the reading section can be shortened. As such, the reading section does not affect the area surrounding the device when rotated. Further, a large space can be created above the recording section with only a small rotation of the reading section. Since the rotating shaft is not positioned in this space, the shaft does not become an obstruction when performing an ink cartridge replacement operation.

A control panel is further provided. The reading section is disposed on the lower surface of the control panel and rotatable together with the control panel, such that the front end of the control panel rotates downward. When a force is added to the front end of the control panel, the reading section rotates by its own weight. Hence, it is possible to facilitate an operation to rotate the reading section. Further, since the control panel is positioned on the near side of the outer casing, it is possible to confirm displays in the display portion even when the reading section is rotated.

A document holding section is further provided that extends from the rear end of the control panel for supporting documents to be conveyed to the reading section. The document holding section is rotatable together with the reading section and serves as a cover for covering the recording section when not rotated open. When the reading section is not rotated open, the document holding section covers the top of the recording section. Hence, there is no need for a special part to cover the recording section and the multi-functional device can be decreased in size. Further, the document holding section rotates together with the reading section, allowing the construction of the multi-functional device to be simplified over conventional devices, which required the document holding section to rotate independently.

The recording section may include an ink-jet printer provided with an ink cartridge that can be upwardly removed from the ink-jet printer after rotating the reading section away from the recording section. The ink cartridge is disposed in a near vertical orientation when accessed from the open space over the recording section, enabling the user to easily confirm the position of the ink cartridge during the ink cartridge replacement operation. Further, since nothing is positioned above the ink cartridge, replacement of the cartridge can be performed efficiently.

The reading section is disposed adjacent to the recording section and covers at least a portion of the recording section. Stated differently, the reading section is disposed to vertically overlap the rear part of the recording section. Therefore, it is possible to conserve space and make the device more compact.

A document discharge tray is further provided which pivotally and detachably mounted near the front edge of the reading section for receiving documents discharged from the reading section. The document discharge tray is maintained at a predetermined angle when in use and is rotatable in a direction opposite the rotating direction of the reading section. Hence, even when the document discharge tray contacts the recording paper discharge tray due to the rotation of the reading section, the rotational movement of the reading section is not hindered by the existence of the document discharge tray. Therefore, the reading section can be rotated sufficiently to form a large space over the recording section, even when the document discharge tray remains mounted on the reading section. Accordingly, it is not necessary to remove the document discharge tray when performing maintenance on the recording section, replacing the ink cartridge, or the like.

A document discharge tray mounting portion is further provided, on which the document discharge tray is mounted. The document discharge tray is mounted on the document discharge tray mounting portion from upward. As such, it is possible to view from above the mounting operation of the document discharge tray in the mounting portion, mounting of the tray in the mounting portion can be performed with ease.

A recording paper discharge tray is provided on the front end of the outer casing for receiving recording paper discharged from the recording section. The recording paper discharge tray normally slants upward and is displaced downward due to contact from the reading section when the reading section is rotated. The recording paper discharge tray slants upward during normal operations, enabling recording paper discharged from the recording section to be stacked orderly on top of the tray. When the cover member is rotated open, the recording paper discharge tray is displaced downward due to contact from the cover member, preventing the tray from limiting the open angle of the cover member and enabling the cover member to be opened at a large angle. Accordingly, maintenance work on the recording section and replacement of the ink cartridge can be performed efficiently with the cover member opened wide.

An urging member may be provided wherein the recording paper discharge tray is rotatably supported on the outer casing and is supported by the urging member to slant upward. Hence, when the cover member is rotated to contact the recording paper discharge tray, the force of the rotation opposes the urging force of the urging member and easily displaces the recording paper discharge tray downward. When the cover member separates from the recording paper discharge tray, the tray is returned to its normal upward slanting position by the urging force of the urging member.

Preferably, the urging member is made of a leaf spring that supports the recording paper discharge tray by contacting the underside of the recording paper discharge tray at a center between the leftside and the rightside. The leaf spring is used as the urging member, enabling a simple construction. Further, since the urging member contacts the recording paper discharge tray on the underside of the tray at the left and right center point, the tray can be maintained in a stable and well-balanced condition, even when sheets of recording paper are stacked on it.

The leaf spring is provided beneath the recording paper discharge tray and also beneath an opening formed on the lower side of the outer casing. The recording paper discharge tray includes a downward protruding portion that contacts the leaf spring via the opening. The leaf spring is provided beneath the outer casing and is concealed by the same, so as not to detract from the overall appearance of the device. Further, the protruding portion on the recording paper discharge tray contacts the leaf spring through the opening in the outer casing, quickly transferring the force of the cover member to the leaf spring and enabling the tray to be displaced downward.

The document discharge tray contacts the recording paper discharge tray when the reading section is rotated and rotates in a direction opposite the rotational direction of the reading section into a receded position. The recording paper discharge tray is supported by an urging member to slant upward away from the outer casing. Hence, when the cover member is rotated to contact the recording paper discharge tray, the force of the rotation opposes the urging force of the urging member and easily displaces the recording paper discharge tray downward. When the cover member separates from the recording paper discharge tray, the tray is returned to its normal upward slanting position by the urging force of the urging member.

The outer casing includes left and right side covers, between which the reading section is rotatably supported on the shaft. The reading section has left and right walls on which ribs are formed, the ribs being in sliding contact with the left and right side covers at all times, even when the reading section is rotated. Hence, when the reading section is rotated back to its original position, there is no risk of the reading section catching on the inner edges of the side covers. Accordingly, the reading section can be easily returned to its original position, even when the left and right side covers are pushed inwardly.

The back edge of the reading section protrudes above the left and right side covers when the reading section is rotated. The ribs include linear protrusions extending in a direction nearly parallel to the control panel, such that one portion of the ribs protrudes above the left and right side covers when the reading section is rotated. With this construction, when the reading section is rotated open about the rotating shaft, the ribs slide in contact with the inside surface of the left and right covers and one portion of the ribs protrudes above the side covers along with the back of the reading section, even when the inner edges of the left and right side covers are bent inwards. Hence, when returning the reading section to its original position, a gap equivalent to the height of the ribs is maintained between the reading section and the inside edges of the left and right side covers, and a sliding surface formed to fit the ribs guides the rotating reading section into place. As a result, the reading section can be smoothly rotated, improving operability.

The outer casing includes side frame plates formed with holes. The shaft is formed from a hollow cylindrical member integrally provided on the lower surface of the reading section and supported via penetration of the two ends through the holes in the side frame plates. A harness connected to the reading section passes through the hollow shaft and extends externally. The harness from the reading section passes through the hollow cylindrical member, allowing the reading section to be rotated without exposing the harness on the surface. Accordingly, the harness does not hinder maintenance or other operations, and accidents that can break the wires in the harness can be avoided.

The circumferential surface of the shaft is formed with an opening that is in fluid communication with the end openings. The harness passing through the hollow shaft extends externally via the opening. Surfaces around the end openings of the shaft are capable of contacting ribs provided on inner walls of the side frame plates. The side frame plates of the outer casing are reinforced by the shaft of the reading section. Hence, if the multi-functional device is dropped on its side, this construction resists displacement to the cover, preventing the cover from being damaged. Moreover, since the harness is drawn externally through openings formed in the circumferential surface of the shaft, the harness does not become pinched between the end surface of the shaft and the inner wall of the side cover, avoiding damage to the wires in the harness.

Stopper members are provided on the left and right walls of the reading section for contacting the side frame plates of the outer casing to position the reading section relative to the outer casing. As such, the left and right position of the reading section in relation to the side frame plates can be easily fixed.

The shaft has a circumferential surface on which protruding portions are provided for interposing the side frame plates of the outer casing between the protruding portions and the stopper members in order to position the reading section relative to the outer casing. As such, the left and right position of the reading section can be fixed by providing a positioning member on only one side of the shaft.

BRIEF DESCRIPTION OF THE DRAWINGS

The above and other objects, features and advantages of the invention will become more apparent from reading the following description of the preferred embodiment taken in connection with the accompanying drawings in which:

FIG. 19 is an explanatory diagram showing the reading section in its rotated position according to the second embodiment of the present invention.

DETAILED DESCRIPTION OF THE PREFERRED EMBODIMENT

Figure 1:
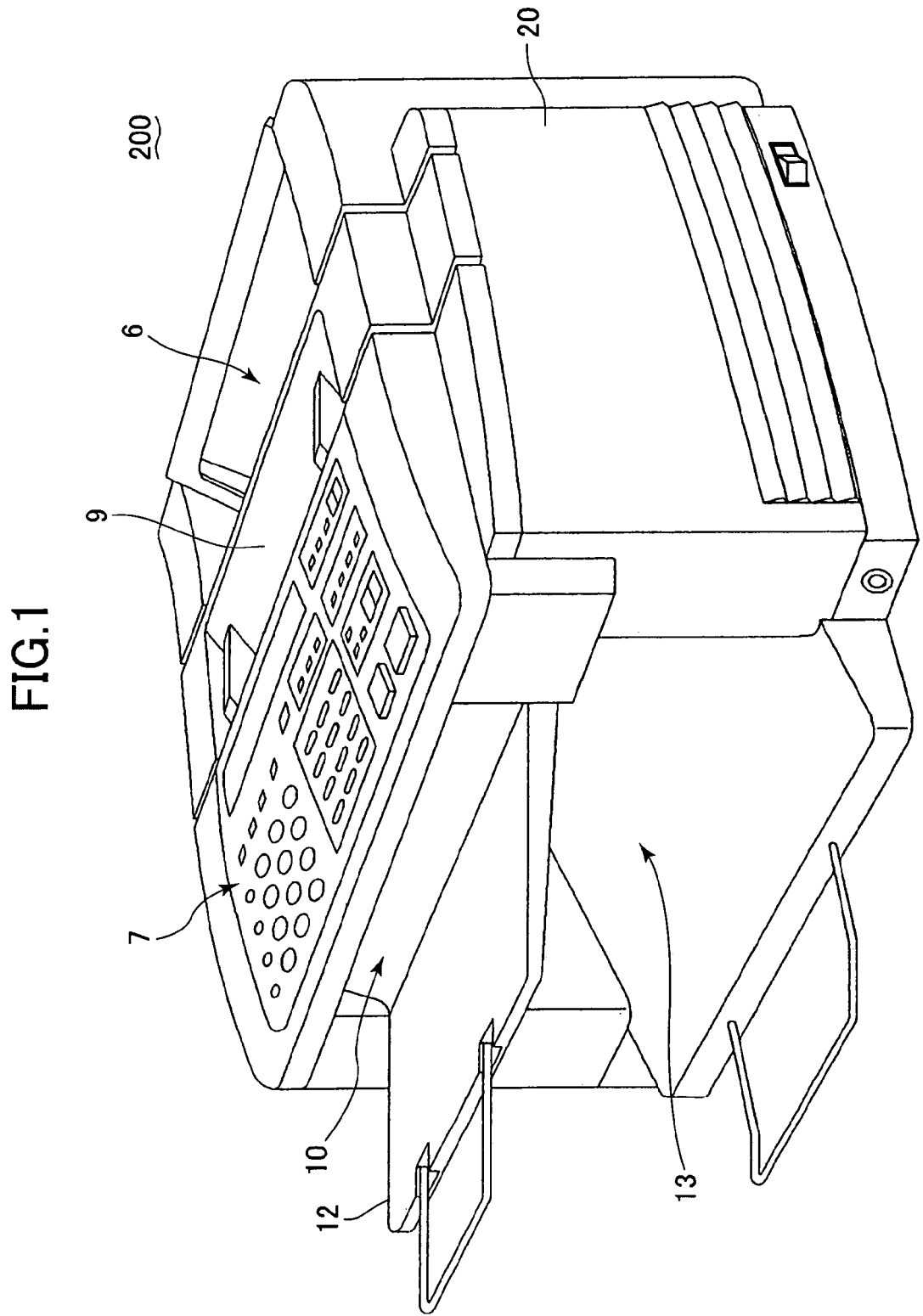
FIG. 1 is an external perspective view of a conventional multi-functional device.
Figure 2:
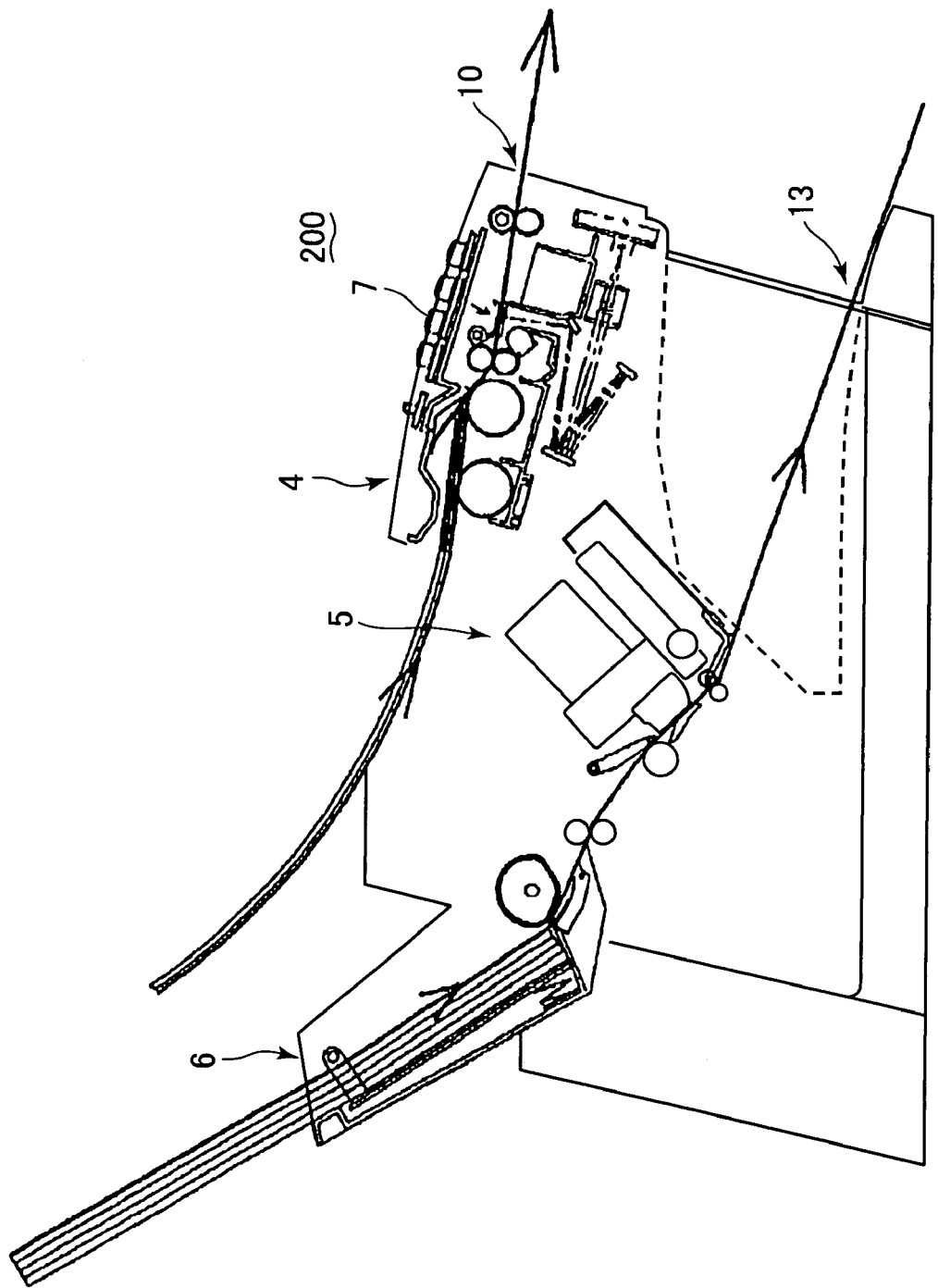
FIG. 2 is a cross-sectional view showing the general internal construction of the same conventional device.
Figure 3:
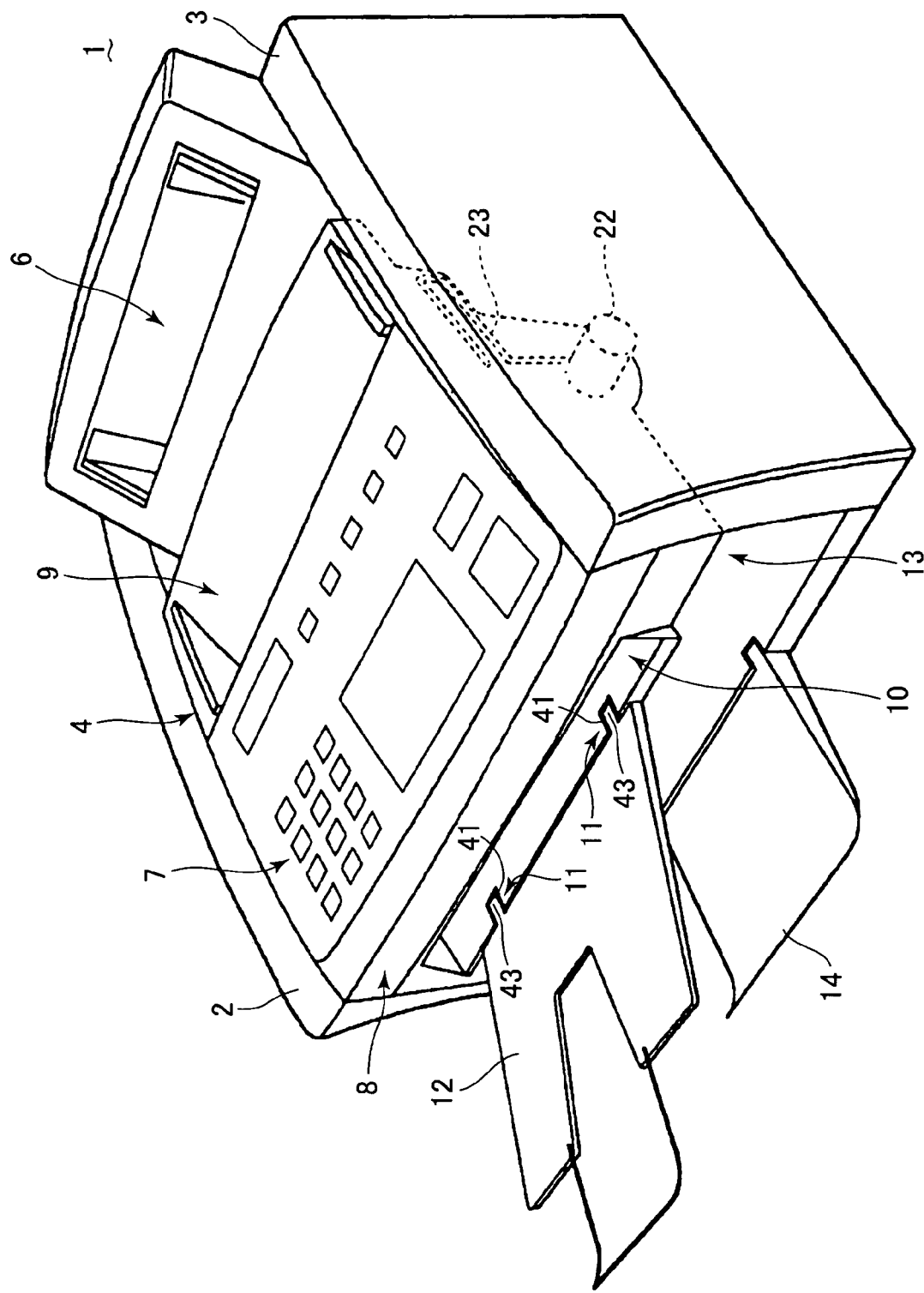
FIG. 3 is an external view of a multi-functional device according to a first embodiment of the present invention, which device includes a scanner as the reading section.

A multi-functional device according to a first embodiment of the present invention will be described while referring to the accompanying drawings. FIG. 3 shows an external view of a multi-functional device equipped with a scanner, which is the reading device of the present embodiment. This multi-functional device 1 contains such functions as facsimile functions, printer functions, copying functions, and scanning functions.

The multi-functional device 1 includes a box-shaped outer casing 8. The left and right side surfaces of the outer casing 8 are covered with side covers 2 and 3. The side covers 2 and 3 are attached via a frame (not shown). A shaft portion 22 (FIG. 4) is provided on the outer casing 8 between the side covers 2 and 3. An image reading unit 4 is disposed to freely rotate about the shaft portion 22 and functions to read image data from a document (not shown). A recording section 5 (FIG. 4) is provided inside the outer casing 8 for recording images on a recording paper. The image reading unit 4 is disposed on the front side of the recording section 5, such that the rear portion of the image reading unit 4 vertically overlaps the recording section 5, thereby conserving more space in the depth direction than conventional devices. A recording paper cassette 6 is mounted on the back portion of the outer casing 8 for maintaining recording paper.

On the front side of the outer casing 8, a control panel 7 is disposed on the top surface of the image reading unit 4. The control panel 7 includes an LCD display portion and a key operation portion. A document support portion 9 is mounted on the back portion of the control panel 7 and is capable of supporting a stack of copy originals to be copied when using the copy function or facsimile originals to be transmitted to another facsimile device when using the facsimile function. A document discharge portion 10 is provided on the front surface of the outer casing 8. The document discharge portion 10 is provided with a mounting portion 11, on which a document discharge tray 12 is mounted. To facilitate mounting the document discharge tray 12 onto the mounting portion 11, protruding piece 43 are provided on the document discharge tray 12 and depressions 41 are formed in the mounting portion 11. When mounting the document discharge tray 12 onto the mounting portion 11, the protruding pieces 43 are fitted from above into the depressions 41. A recording paper discharge portion 13 is provided on the lower side of the document discharge portion 10. A recording paper discharge tray 14 is mounted in the recording paper discharge portion 13. There are no particularly restrictions on the materials used to form the document discharge tray 12 and recording paper discharge tray 14. These trays can be formed of a synthetic resin such as polypropylene or a metal such as an aluminum alloy, even in the form of a wire mesh.

Figure 4:
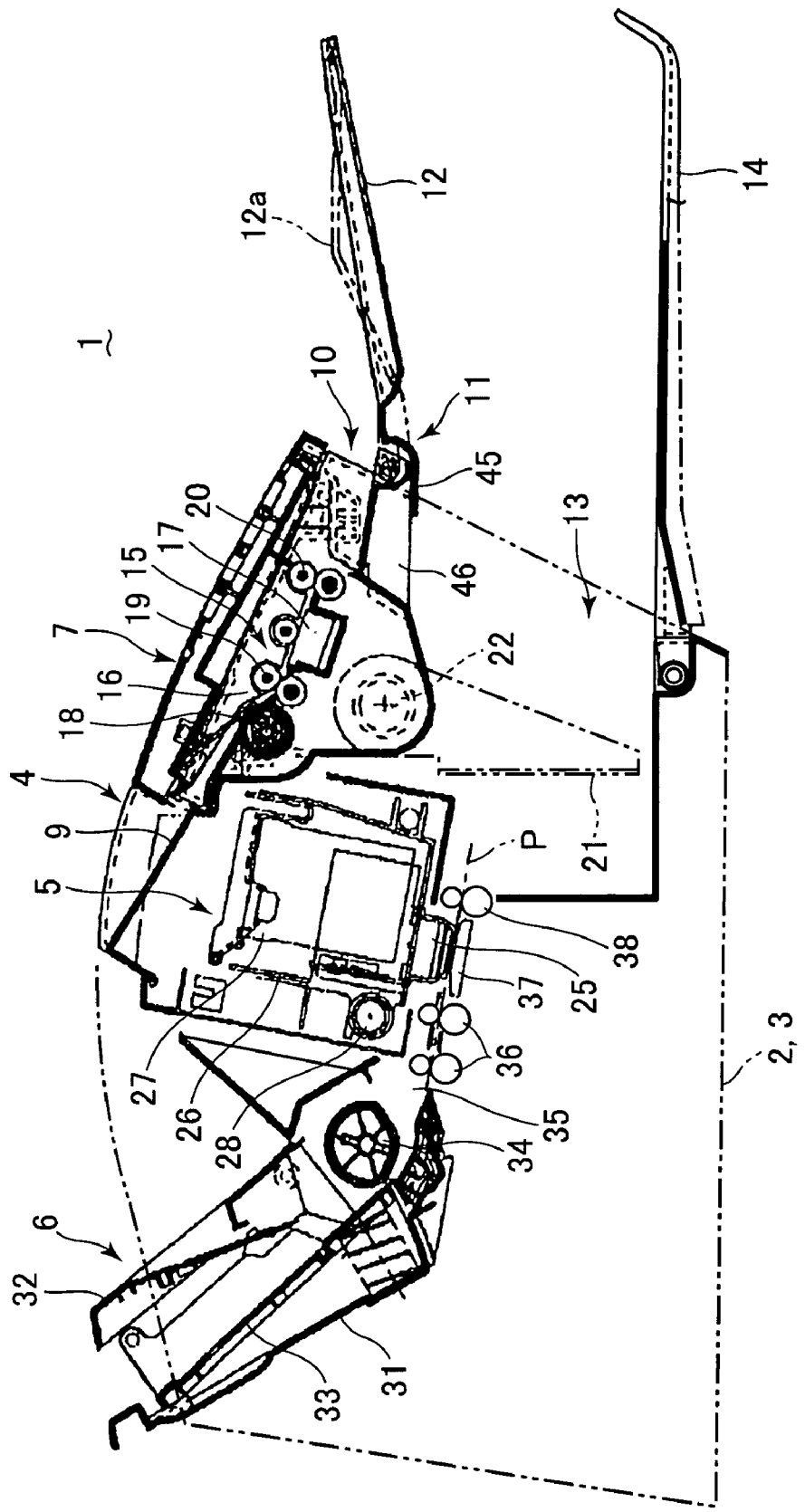
FIG. 4 is a cross-sectional view of the multi-functional device shown in FIG. 3.

Next, the various components of the multi-functional device 1 will be described with reference to FIG. 4. The image reading unit 4 includes a scanner 15. The scanner 15 is equipped with an image sensor 17, such as a CCD. A conveying path 16 through which a document supported by the document support portion 9 is conveyed is formed along the image sensor 17. The conveying path 16 is provided with a separation roller 18 for supplying the documents one sheet at a time, a feed roller 19 for conveying the documents along the conveying path 16, and a discharge roller 20 for discharging the document onto the document discharge portion 10 after the document has been read. The image reading unit 4 is supported via the shaft portion 22 on side frame plates 21, which are formed of metal. The control panel 7 and document support portion 9 are capable of rotating together forward until the front side of the control panel 7 is facing downward. This rotation can be performed whenever it is necessary to open a space above the recording section 5. The shaft portion 22 and image reading unit 4 are disposed closer to the front of the outer casing 8 than the recording section 5. The shaft portion 22 is positioned on the lower end of the image reading unit 4 and adjacent to the recording section 5.

With this construction, the image reading unit 4 can be rotated toward the front of the outer casing 8 without obstructing the operations of the recording section 5. Further, since the shaft portion 22 and the image reading unit 4 are not positioned above the recording section 5, these two components will not hinder maintenance or other operations performed on the recording section 5. Moreover, the image reading unit and recording section 5 are disposed nearer to each other, thereby enabling a more compact construction in the depth direction of the device. In addition, by positioning the shaft portion 22 on the lower end of the image reading unit 4 and abutting the recording section 5, it is possible to shorten the rotational diameter of the image reading unit 4. As a result, the image reading unit 4 can be rotated without it colliding with objects placed near the device, and the user can perform the operation without difficulty.

Figure 5:
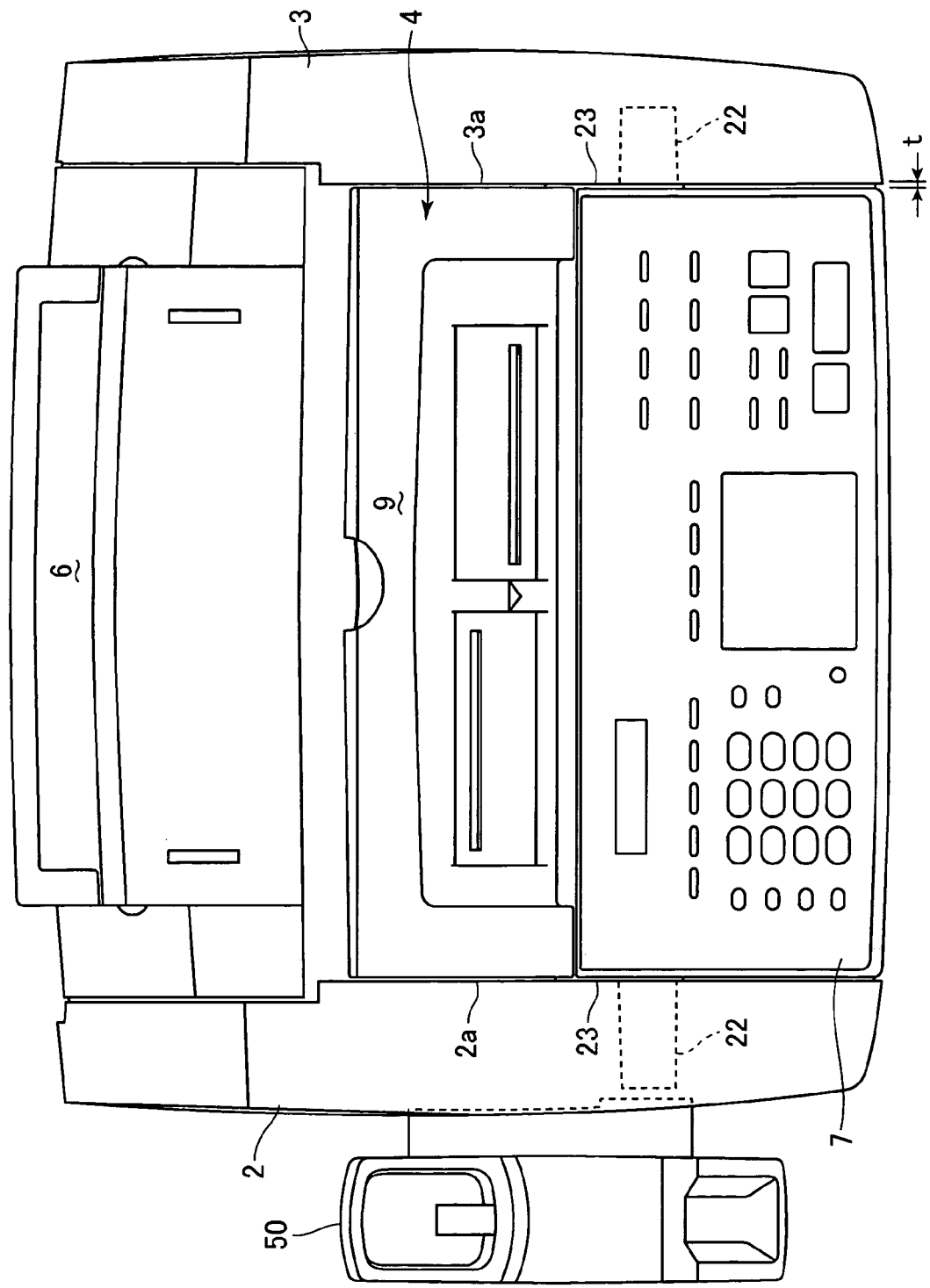
FIG. 5 is a plan view of the multi-functional device shown in FIG. 3.
Figure 6:
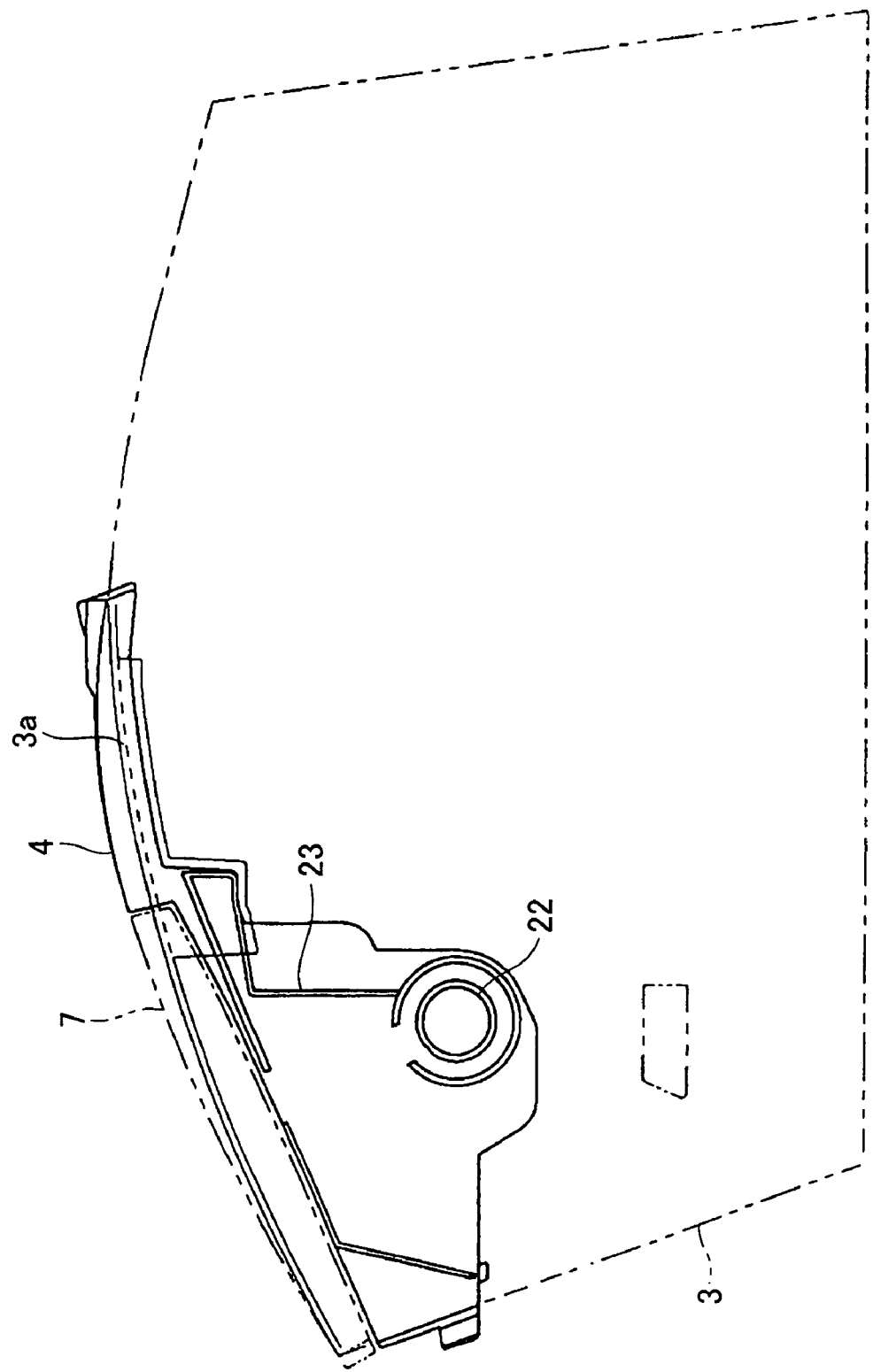
FIG. 6 is a side view showing the construction of ribs provided on the reading section when the reading section is in its closed state.
Figure 7:
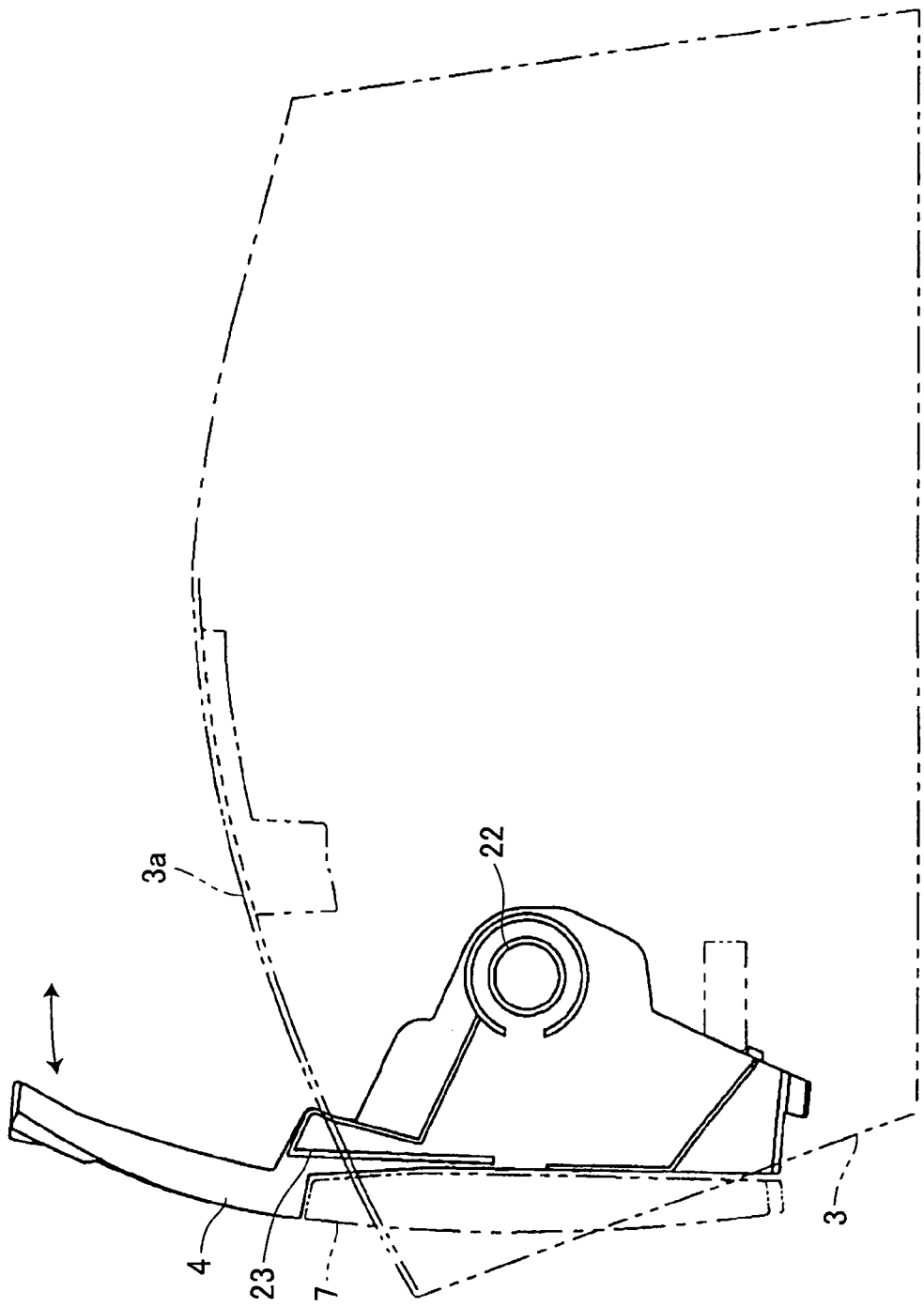
FIG. 7 is a side view showing the reading section in its open state.

As shown in FIGS. 5–7, the left and right side covers 2 and 3 include inner edges 2a and 3a (FIG. 5). Ribs 23 are formed on the side walls of the image reading unit 4 and protrude in the form of pitch blocks to be in sliding contact with the inner edges 2a and 3a. The ribs 23 are in sliding contact with the inner edges 2a and 3a of the side covers 2 and 3, even when the image reading unit 4 is rotated. By providing these ribs 23 on the left and right edges of the image reading unit 4, a gap t is formed between the inner edges 2a and 3a and the image reading unit 4.

When the image reading unit 4 is rotated about the shaft portion 22 to a forward-tilting position, as shown in FIG. 7, the back end of the image reading unit 4 protrudes higher than the side covers 2 and 3, but the ribs 23 are still in sliding contact with the inner edges 2a and 3a. Moreover, the ribs 23 are only formed on the side walls of the image reading unit 4 near the shaft portion 22 and are not formed on the back end of the image reading unit 4. Accordingly, the gap t equal to the height of the ribs 23 exists between the side surfaces on the back end of the image reading unit 4 and the inner edges 2a and 3a of the side covers 2 and 3. This gap t allows the image reading unit 4 to be closed, that is returned from the rotated position shown in FIG. 7 to the original position shown in FIG. 6, without the rear end or edges of the image reading unit 4 catching on the inner edges 2a and 3a of the side covers 2 and 3, even if the side covers 2 and 3 are pressed in from the side. It is further desirable that the ribs 23 are continuously formed to avoid an edge effect occurring at the point of contact with the inner edges 2a and 3a.

Figure 8:
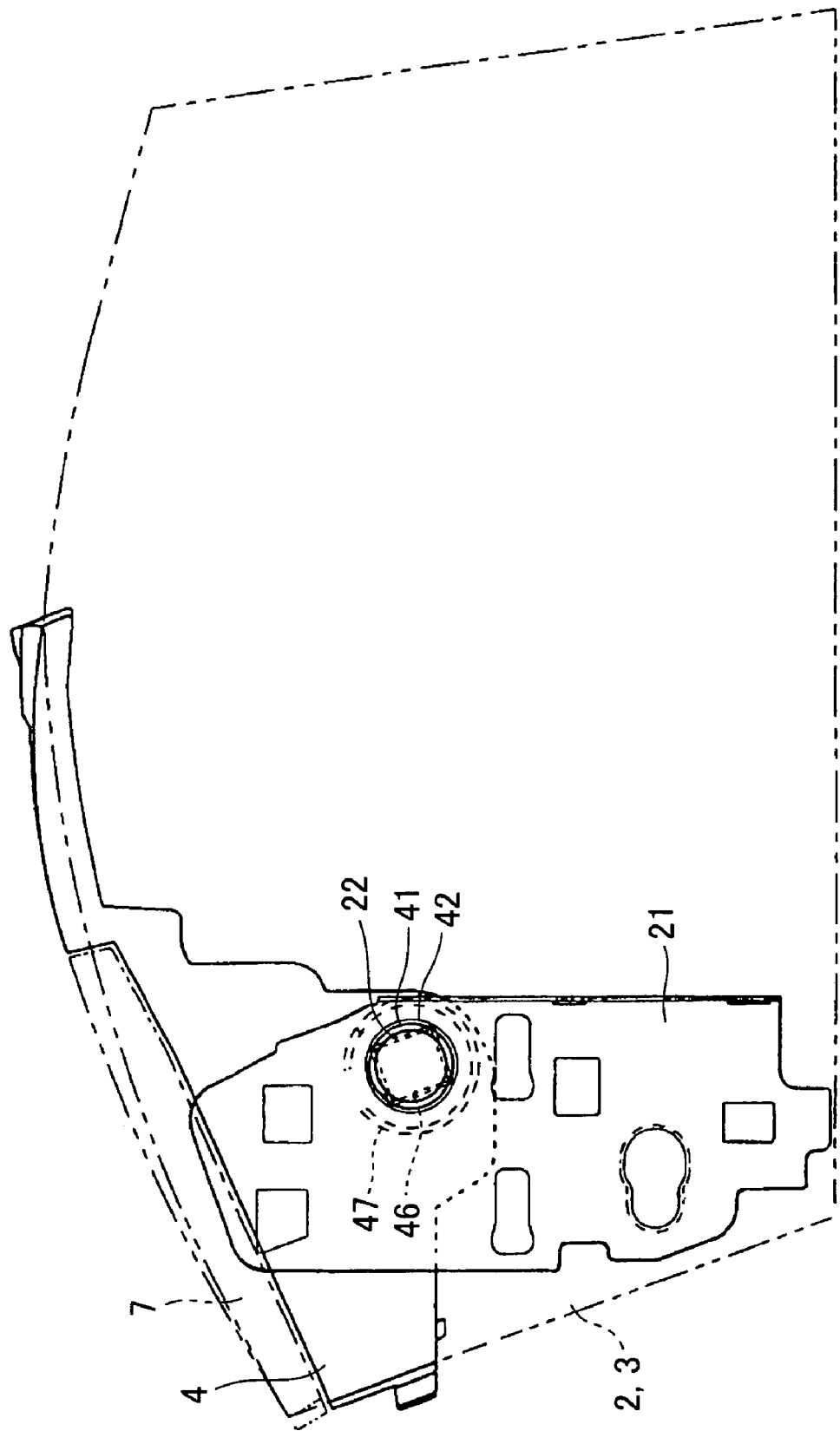
FIG. 8 is a side view showing the shaft support construction for the reading section and the ribs.
Figure 9:
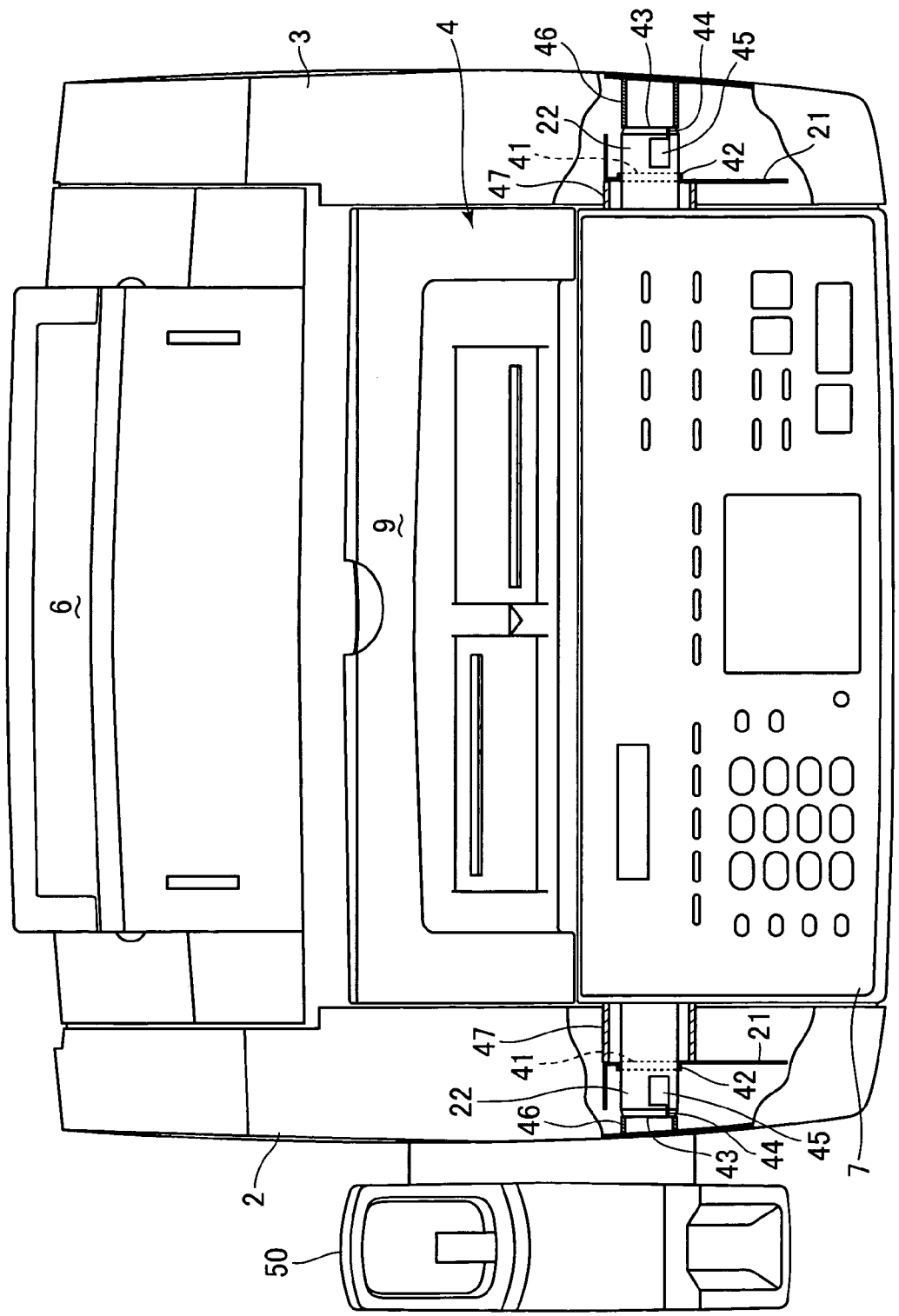
FIG. 9 is a plan view showing a relevant cross-section of the multi-functional device according to the first embodiment of the present invention.

FIG. 8 is a side view showing the support structure for the shaft of the image reading unit 4. FIG. 9 is a plan view of the multi-functional device 1. The shaft portion 22 of the image reading unit 4 is a hollow cylinder integrally formed on the left and right walls of the outer casing 8. The image reading unit 4 is rotatably supported in the outer casing 8 by inserting the ends of the shaft portion 22 into the depressions 41. The depressions 41 are circular openings having inner walls 42 that contract in diameter toward the outside. A harness containing electrical and signal wires for connecting the image reading unit 4 and a control unit (not shown) passes through the hollow inside of the shaft portion 22. More specifically, openings 45 are provided in the circumferential surface of the shaft portion 22 and are in fluid communication with the open ends 43 via slits 44. The harness is drawn externally through these opening portions 45.

are formed on the inner walls of the side covers 2 and 3 and are capable of contacting the open ends 43 of the shaft portion 22. Through this contact, the side covers 2 and 3 are reinforced by the ends of the shaft portion 22. Hence, if the image recording device is dropped on its side, the side covers 2 and 3 can restrain displacement and avoid damage. Further, since the harness is not interposed between the open ends 43 and the inner walls of the side covers 2 and 3, there is no fear of breaking wires in the harness. The opening portions 45 through which the harness passes are positioned on the external side away from the inner walls 42 to avoid them being worn by the contracting edges of the same.

Cylindrical rib-shaped stopper members 47 are concentric to and integrally formed around the circumference of the shaft portion 22. These stopper members 47 are contacted by the inner side of the left and right frame side plates 21, which contact is used to set the left and right position of the image reading unit 4. A handset rest 50 for holding a telephone handset is disposed on the side of the side cover 2.

Figure 10:
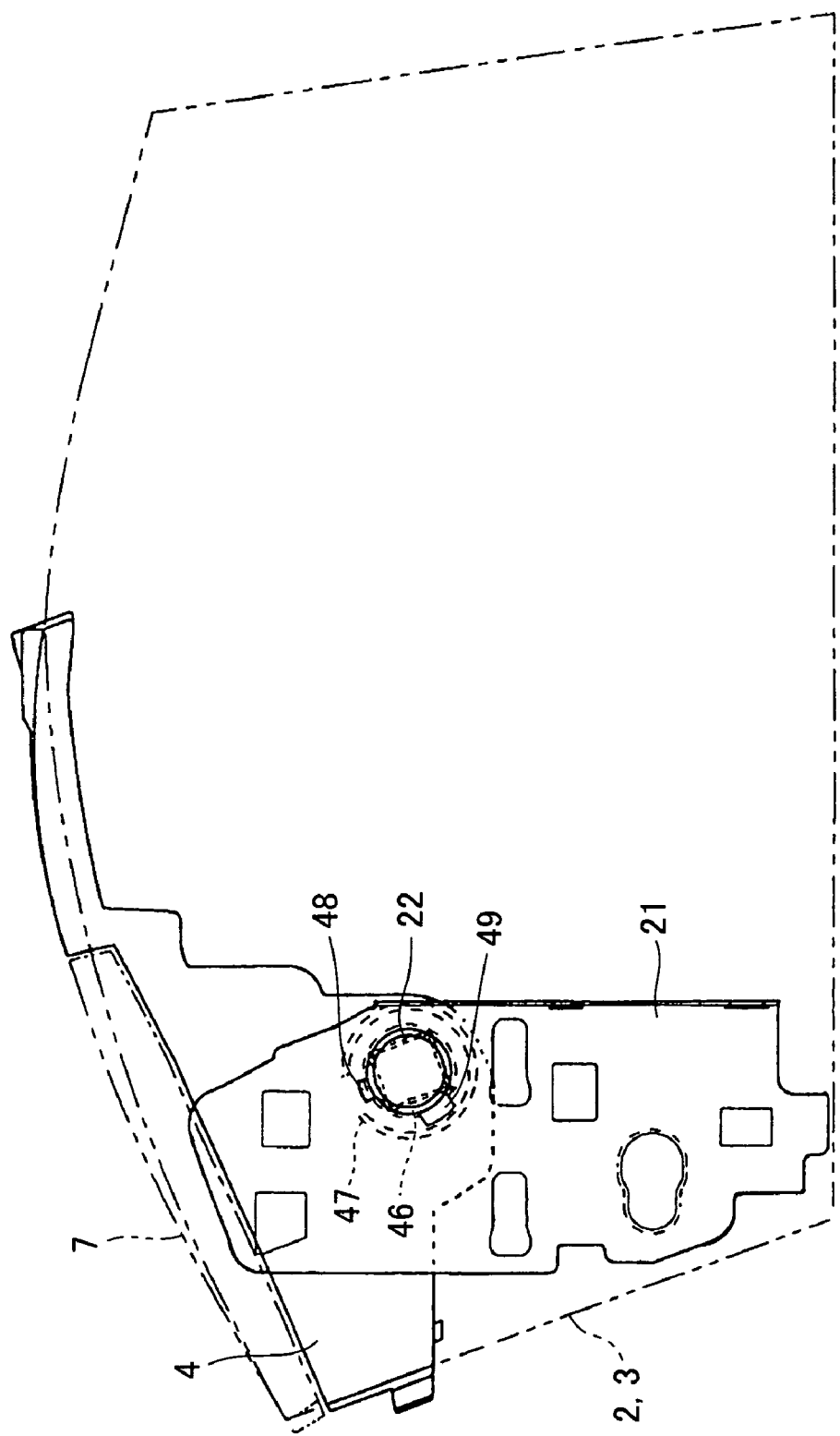
FIG. 10 is a side view showing the shaft support construction for the reading section using a variation of the ribs.
Figure 11:
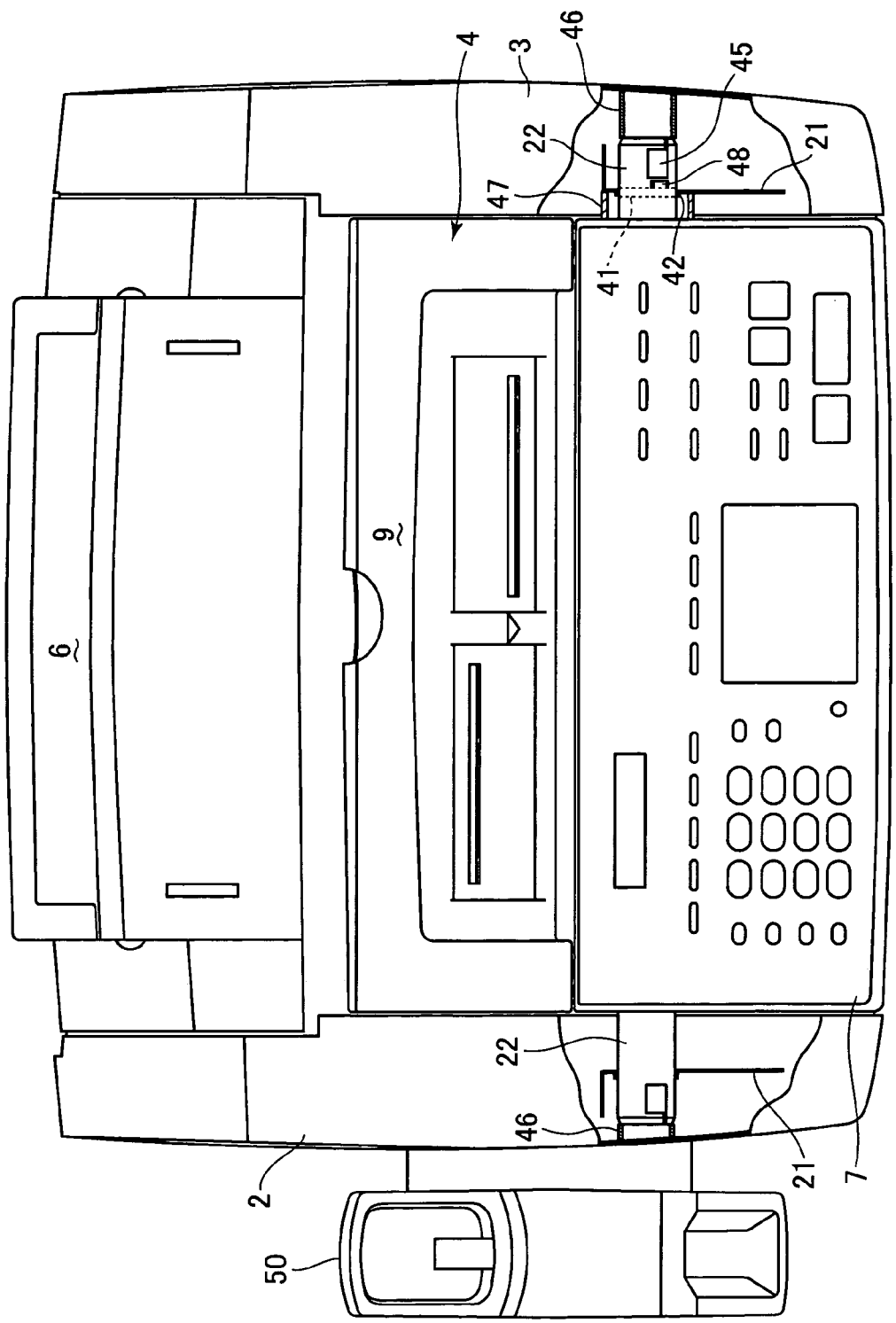
FIG. 11 is a plan view showing a relevant cross-section of the multi-functional device according to the first embodiment of the present invention using the variation of the ribs shown in FIG. 10.

A support structure for the shaft of the image reading unit 4 as shown in FIG. 10 is also possible. With this structure, the multi-functional device 1 will look like that in FIG. 11 from a plan view. In the present embodiment, protruding portions 48 are formed on one portion of the circumferential surface of the shaft portion 22. With this construction, the frame side plates 21 are pinched between the protruding portions 48 and the stopper members 47 in order to set the left and right position of the image reading unit 4. Cutout portions 49 are provided in one portion of the constricting depressions 41 to allow the protruding portions 48 on the shaft portion 22 a path to pass through when assembling the multi-functional device 1. Here the depressions 41 contract in diameter toward the inside. The remaining construction of the support structure is the same as that described above with reference to FIGS. 8 and 9. With this construction, it is also possible to set the left and right position of the image reading unit 4 on only one side of the shaft portion 22. With this construction, the harness connecting the image reading unit 4 passes through the hollow shaft portion 22 and does not impede maintenance and other operations or risk having its wires accidentally broken, even when the image reading unit 4 is rotated.

Since the bottom surface ribs 46 contact the open ends 43 on the shaft portion 22, the side covers 2 and 3 are reinforced by the shaft portion 22, thereby reducing the risks of damage occurring to the side covers 2 and 3, which are formed of plastic materials or the like.

Figure 12:
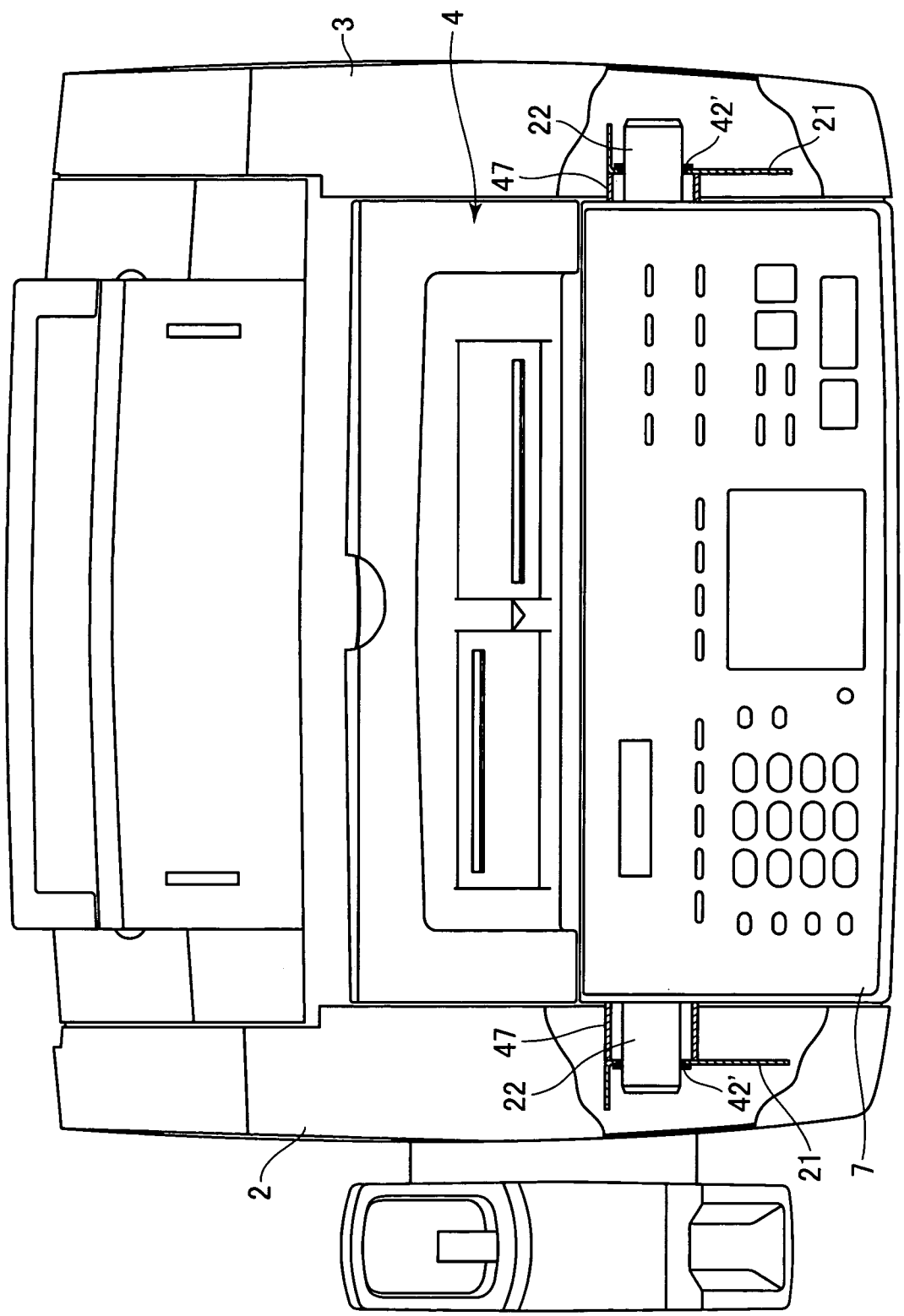
FIG. 12 is a plan view showing a relevant cross-section of a conventional device that does not employ a reinforcing structure.

FIG. 12 shows a conventional device that does not employ a reinforcing structure such as that in the present embodiment. This drawing will be used to describe the improvements made in the device of FIG. 9. Similar parts in the device of FIG. 12 have been given the same numbers used in FIG. 9.

In the construction shown in FIG. 12, space exists between each of the side covers 2 and 3 and the shaft portion 22. Hence, if stress is applied to the outside of either the side cover 2 or 3, the respective side cover will be deformed and can easily incur damage from the shaft portion 22. Here, instead of the contracting the shaft portion 22 is supported by shaft holders 42' provided on the frame side plates 21.

With the device shown in FIG. 9, the box-like ribs 46 on the side covers 2 and 3 contact the open ends 43 of the shaft portion 22, thereby reinforcing the side covers 2 and 3. Moreover, the harness is drawn outward through the to avoid being pinched between the box-like ribs and the open ends 43, thereby eliminating the risk of broken wires in the harness.

The recording section 5 is disposed on the lower part of the document support portion 9 and includes an ink-jet recording head 25 for ejecting ink droplets. The recording head 25 is mounted together with an ink cartridge 27 on a carriage 26 in a near vertical orientation. During recording operations, the carriage 26 is moved in a scanning movement by a driving mechanism (not shown) and is guided on a carriage shaft 28.

The recording paper cassette 6 includes a cassette case 31, a front cover 32, a support plate 33 for supporting recording paper and urging the recording paper via springs, and a feed roller 34. Recording paper P set in the recording paper cassette 6 is supplied one sheet at a time by the feed roller 34 into a conveying path 35. Along the conveying path 35 are provided a feed roller 36, a platen 37 opposing the recording head 25, and a discharge roller 38 for discharging the recording paper P onto the recording paper discharge portion 13 after the image has been recorded. Drive mechanisms for driving each of these rollers have been omitted from the drawings. The document discharge tray 12 is provided with a support arm 12a. The support arm 12a can be extended to allow a document of a size larger than the document discharge tray 12 to be supported on the document discharge tray 12.

Figure 13:
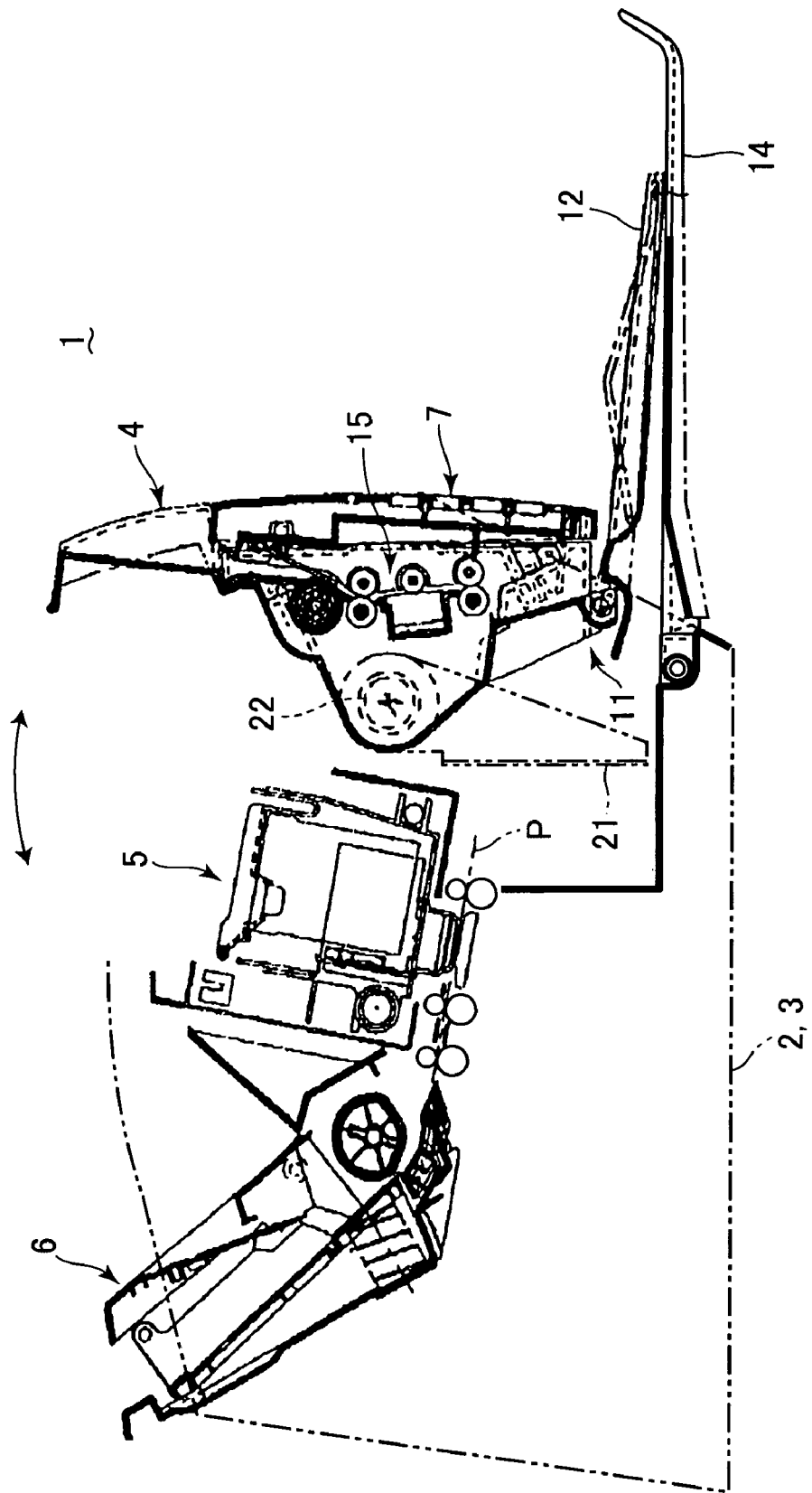
FIG. 13 is a cross-sectional view of the multi-functional device according to the first embodiment of the present invention when the reading section has been rotated open.

FIG. 13 is a cross-sectional view showing the multi-functional device 1 in which the image reading unit 4 has been rotated open. As described above, the image reading unit 4 is configured to rotate about the shaft portion 22 toward the front of the outer casing 8. By rotating the image reading unit 4, the document support portion 9, which is positioned over the recording section 5 and serves as a cover for the recording section 5 is moved to the front of the recording section 5, thereby opening a space at the top of the recording section 5. Accordingly, it is possible to perform maintenance operations to the recording section 5 or replace the ink cartridge 27. Further, since the ink cartridge 27 is disposed at a near vertical orientation in the open section, the position of the ink cartridge 27 can be easily confirmed and removal and replacement operations on the ink cartridge 27 can be performed without difficulty.

Along with the rotation of the image reading unit 4, the document discharge tray 12 is moved downward. As will be described later, the document discharge tray 12 is constructed to rotate in the direction opposite the rotational direction of the image reading unit 4 when the document discharge tray 12 contacts the recording paper discharge tray 14. Hence, the orientation of the document discharge tray 12 in relation to the image reading unit 4 changes so as to not hinder rotation of the image reading unit 4.

Figure 14:
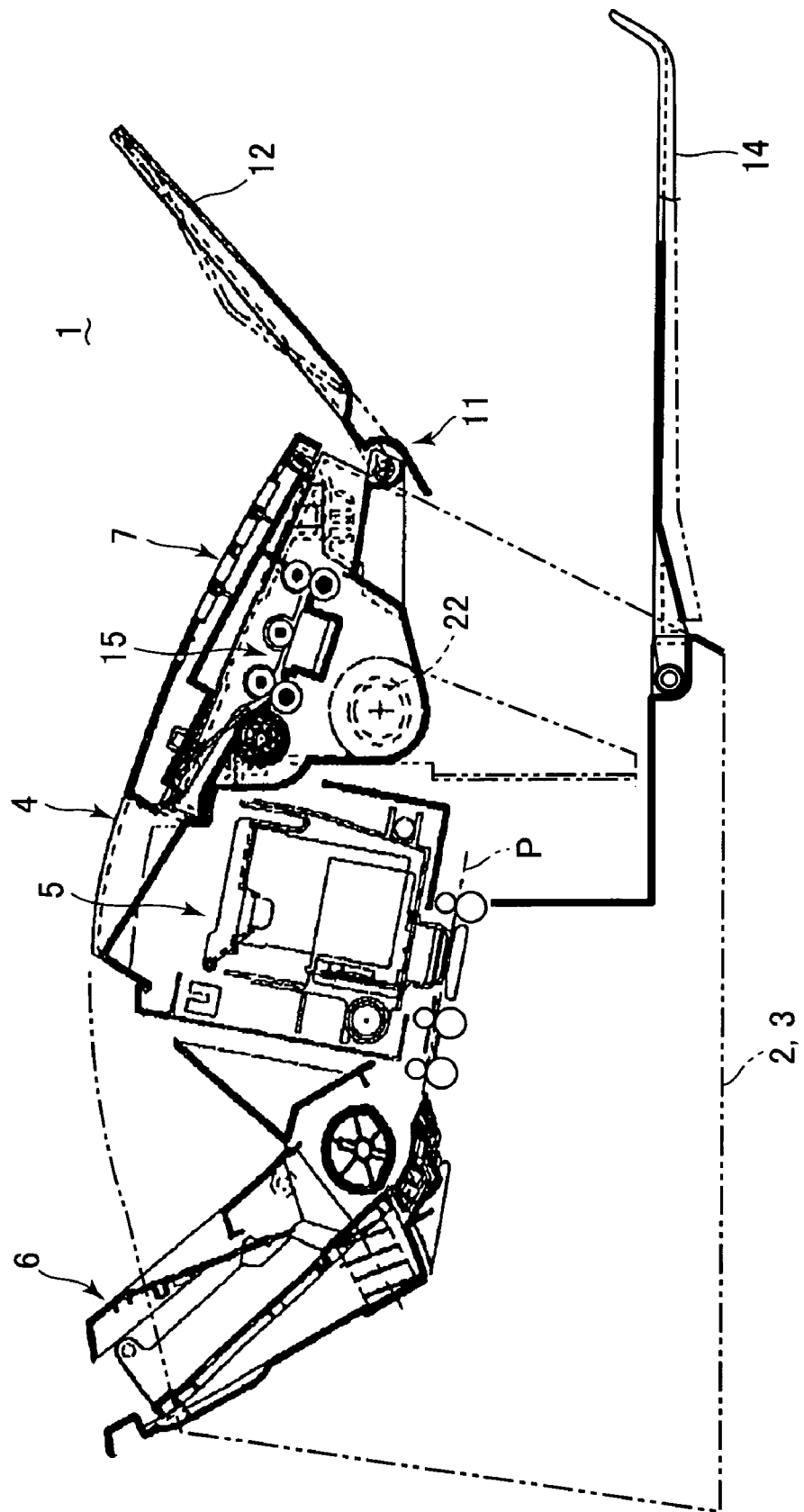
FIG. 14 is a cross-sectional view of the multi-functional device according to the first embodiment of the present invention showing the state of the document discharge tray mounted on the reading section.

FIG. 14 is a cross-sectional view of the multi-functional device 1 showing the state when the document discharge tray 12 is mounted on the image reading unit 4. A protruding portion 45 is provided near the end of the document discharge tray 12 and opposite the image reading unit 4 and extends horizontally. A bottom surface rib 46 is formed on the image reading unit 4 at a position lower than the mounting portion 11 for engaging the protruding portion 45. Through this engagement, the document discharge tray 12 is maintained at a desired angle, as shown in FIG. 4. As described above, the document discharge tray 12 is mounted into the image reading unit 4 by fitting the protruding pieces 43 provided on the document discharge tray 12 into the depressions 41 from above. At the same time, the protruding portion 45 of the document discharge tray 12 is inserted beneath the mounting portion 11.

Figure 15:
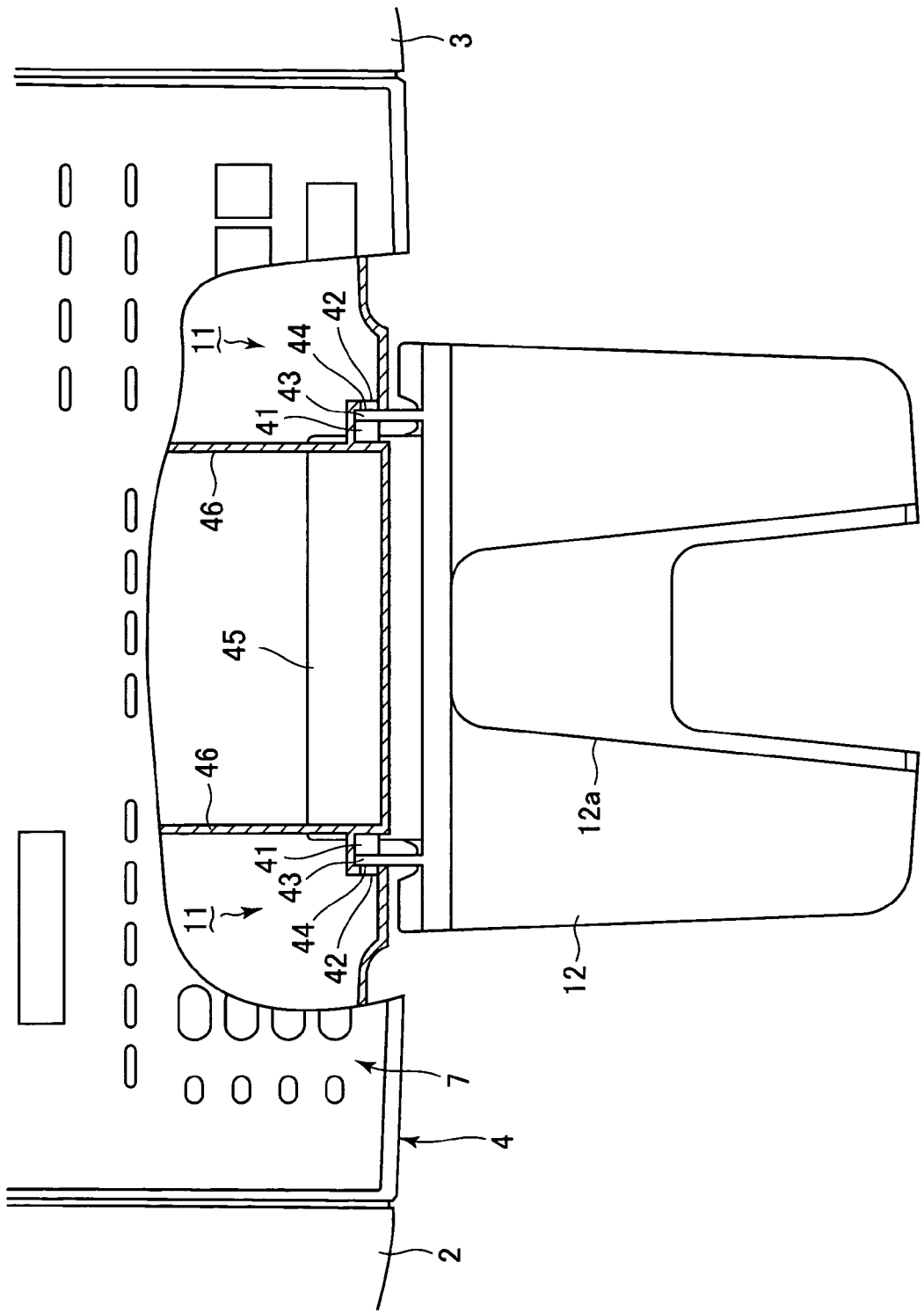
FIG. 15 is a plan view of the multi-functional device according to the first embodiment of the present invention showing a relevant cross-section at which the document discharge tray is mounted on the reading section.

Next, the construction for allowing rotation of the document discharge tray 12 will be described. FIG. 15 is a plan view showing the portion of the image reading unit 4 at which the document discharge tray 12 mounts into the mounting portion 11. As described above, the mounting portion 11 is provided with the depressions 41 and the document discharge tray 12 is provided with the protruding pieces 43. Protrusions 44 are provided on the side surface of the protruding pieces 43. The depressions 41 are provided with inner walls 42 of a size corresponding to the protrusions 44. The size of the inner walls 42 is set such that the protrusions 44 are capable of rotating after being fitted into the inner walls 42. Hence, the document discharge tray 12 is supported on the image reading unit 4 via the protrusions 44 rotatably fitted into the inner walls 42.

With this construction, the protruding pieces 43 of the document discharge tray 12 are fitted from above into the depressions 41 of the mounting portion 11, engaging the protrusions 44 with the inner walls 42, in order to attach the document discharge tray 12 to the image reading unit 4. As described above, the protruding portion 45 of the document discharge tray 12 engages with the bottom surface rib 46 of the image reading unit 4. As a result, the document discharge tray 12 is maintained at a desired angle in relation to the image reading unit 4, while being capable of rotating in the direction opposite that in which the image reading unit 4 rotates open.

Therefore, since the document discharge tray 12 is capable of rotating in the direction opposite the rotational direction of the image reading unit 4, the document discharge tray 12 does not restrict the rotational movement of the image reading unit 4, when rotating the image reading unit 4 forward in order to open a space above the recording section 5. Hence, when rotating the image reading unit 4 in order to open a space above the recording section 5, it is not necessary to remove the document discharge tray 12 from the image reading unit 4. In addition, since the 12 can be mounted into the mounting portion 11 of the image reading unit 4 while looking down on the mounting portion 11 from above, the mounting process can be performed easily.

Next, an image recording device according to a second embodiment of the present invention will be described while referring to FIGS. 16–19. The multi-functional device 1 of the second embodiment differs from that of the first embodiment only in the construction of the recording paper discharge tray 14.

Figure 16:
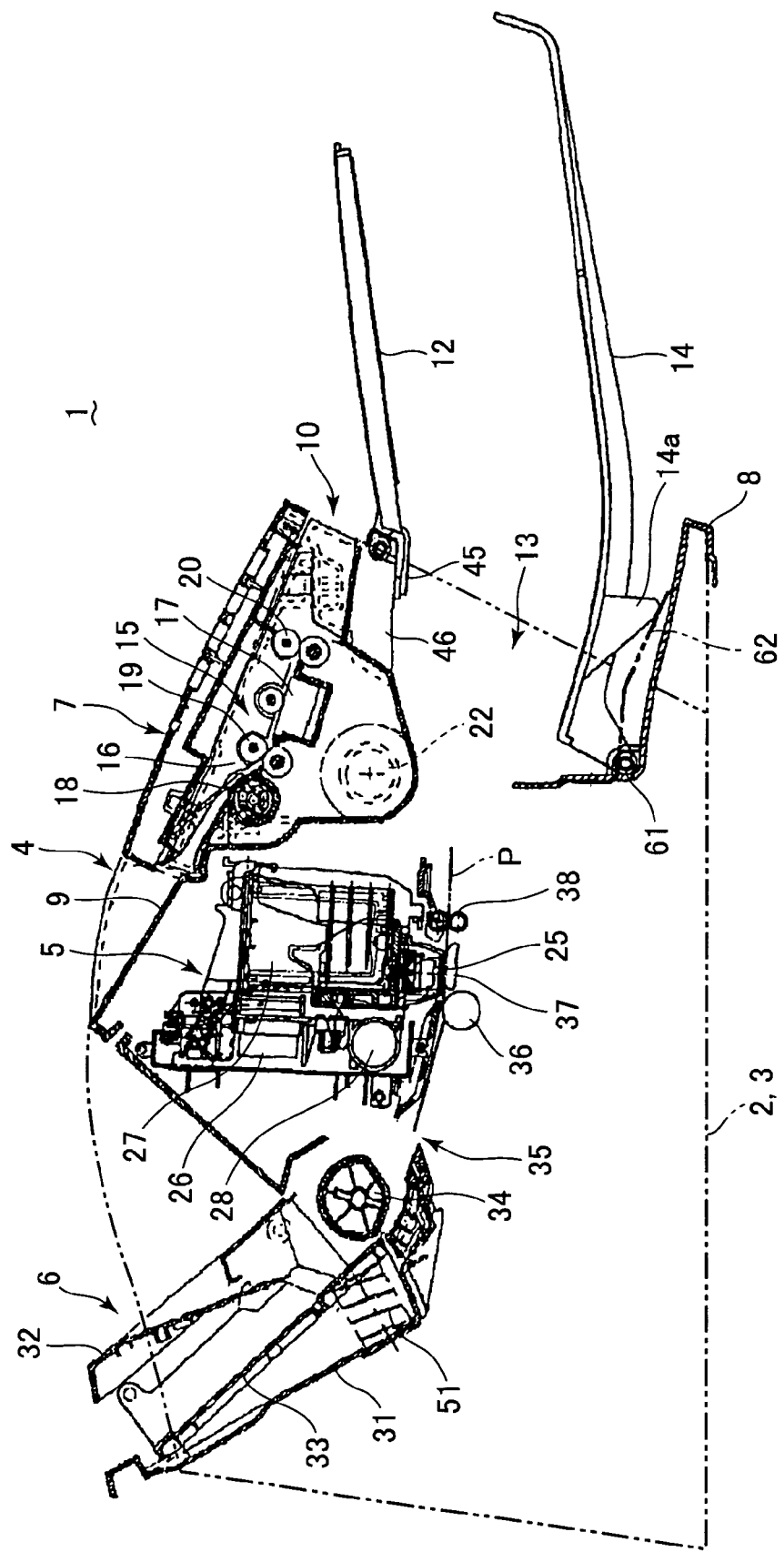
FIG. 16 is a cross-sectional view of the multi-functional device according to a second embodiment of the present invention.

As shown in FIG. 16, the recording paper discharge tray 14 is rotatably supported on a rotating shaft 61. A leaf spring 62 contacts the underside left and right center portion of the recording paper discharge tray 14 for support. This leaf spring 62 holds the recording paper discharge tray 14 in an upwards slanting position during normal operations when paper is discharged via the recording paper discharge portion 13. However, when the image reading unit 4 is rotated open, the recording paper discharge tray 14 can be displaced downward by contact from the image reading unit 4. Accordingly, when the image reading unit 4 is rotated to open space above the recording section 5, the document discharge tray 12 of the image reading unit 4 contacts the recording paper discharge tray 14. As the image reading unit 4 is rotated further, the force of the rotation opposes the force of the leaf spring 62 and the recording paper discharge tray 14 rotates via the rotating shaft 61 and is displaced downward. In other wards, the recording paper discharge tray 14 changes from a forward slanting position to a horizontal state.

Figure 17:
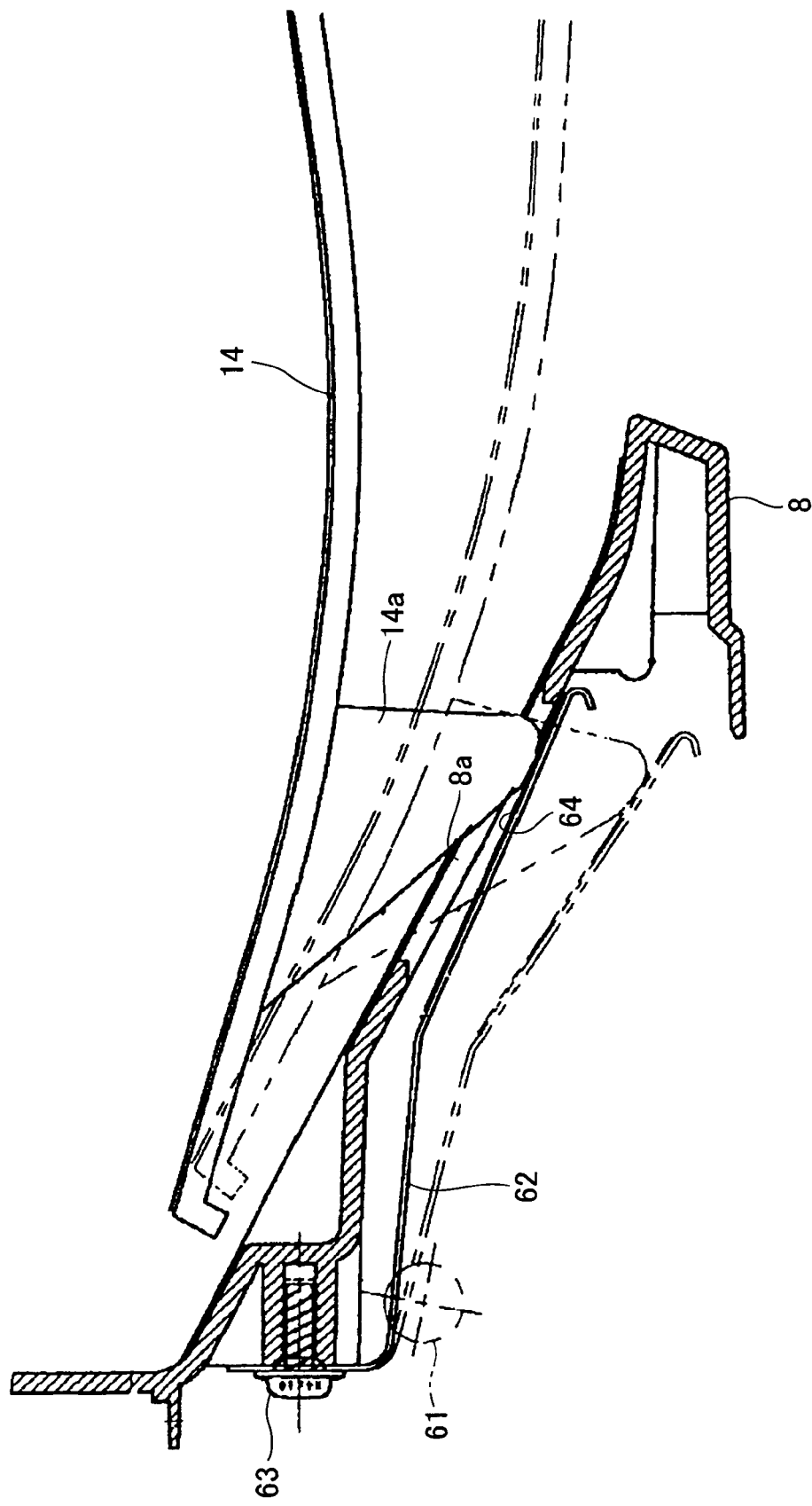
FIG. 17 is a cross-sectional view showing the supported state of the recording paper discharge tray according to the second embodiment of the present invention.

As shown in FIG. 17, the leaf spring 62 is provided on the underside of the outer casing 8 and positioned below the recording paper discharge tray 14. The outer casing 8 includes an opening 8a. The leaf spring 62 extends along the underside surface of the outer casing 8, and the base end of the leaf spring 62 is fixed to the outer casing 8 via a screw 63. The recording paper discharge tray 14 includes a triangular protruding portion 14a that protrudes downward. The protruding portion 14a passes through the opening 8a to directly contact the top surface of the leaf spring 62. The top surface of the leaf spring 62 is covered with an insulating film 64.

Figure 18:
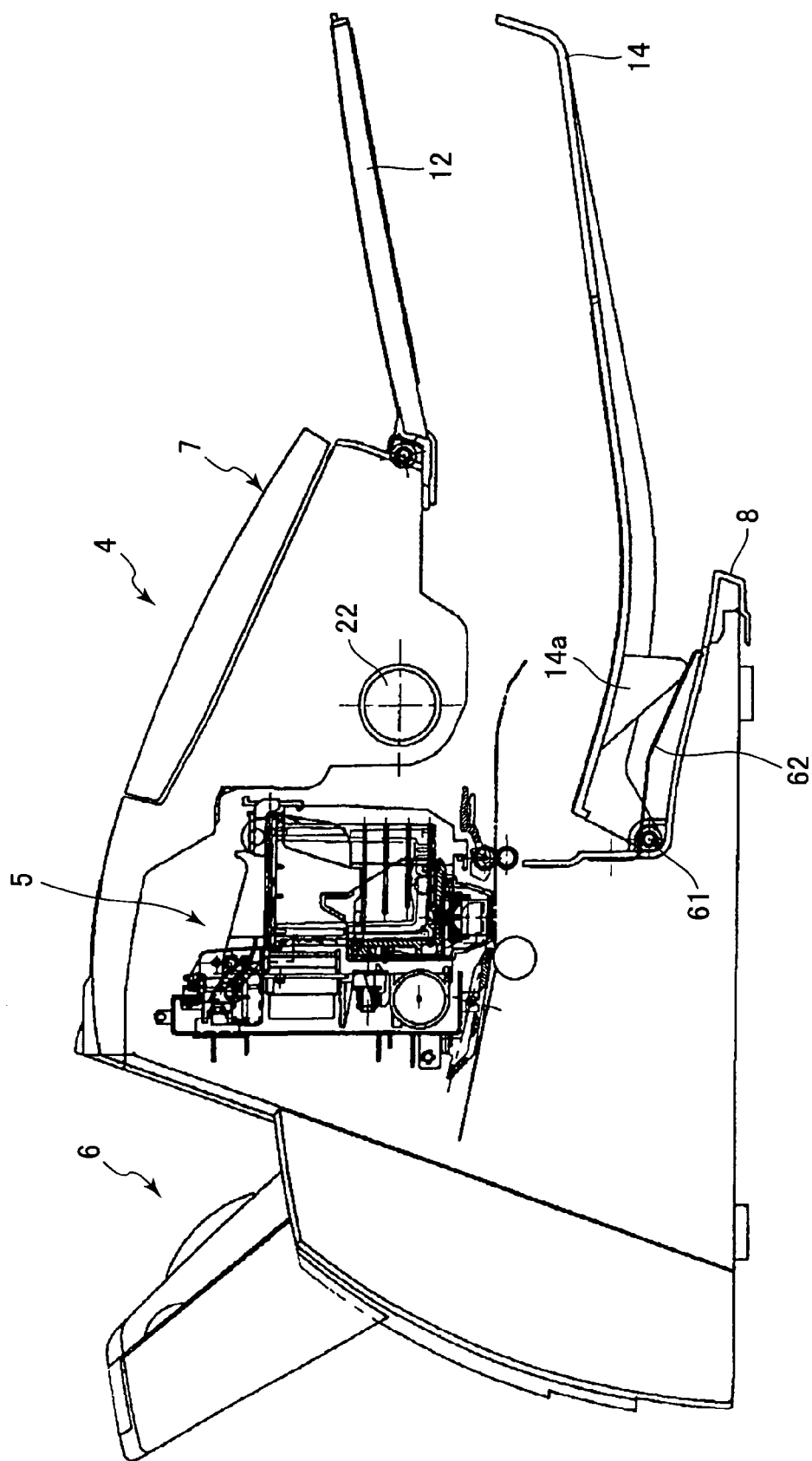
FIG. 18 is an explanatory diagram showing the reading section in its normal operating position according to the second embodiment of the present invention.

With this construction, when the image reading unit 4 is rotated forward around the shaft portion 22 from the state shown in FIG. 18 to the state shown in FIG. 19, the document support portion 9 positioned on top of the recording section 5 is moved toward the front of the recording section 5, opening a space above the recording section 5. At this time, the document discharge tray 12 moves downward as the image reading unit 4 is rotated forward. The document discharge tray 12 is constructed so that, when it contacts the recording paper discharge tray 14, it can rotate in the direction opposite the rotational direction of the image reading unit 4. Therefore, as shown in FIG. 19, the position of the document discharge tray 12 in relation to the image reading unit 4 changes in order not to hinder the rotation of the image reading unit 4. Accordingly, when rotating the image reading unit 4 in order to open a space above the recording section 5, there is no need to remove the document discharge tray 12 from the image reading unit 4.

As the image reading unit 4 is rotated further, the recording paper discharge tray 14, which has been supported in an upward slanting position by the leaf spring 62, is contacted by the image reading unit 4 via the document discharge tray 12 and pushed downward. This pressure opposes the urging force of the leaf spring 62, easily displacing the recording paper discharge tray 14 downward, thereby allowing the image reading unit 4 to be rotated further to open a greater space above the recording section 5. As a result, it is possible to easily replace the ink cartridge 27, perform maintenance work on the recording section 5, or the like.

Further, by rotating the image reading unit 4 in the opposite direction, thereby separating the image reading unit 4 from the recording paper discharge tray 14 and removing the pressure applied to the leaf spring 62, the recording paper discharge tray 14 can be restored to its normal forward slanting state by the urging force of the leaf spring 62.

At the same time, the document discharge tray 12 rotates in the opposite direction relative to the image reading unit 4 by its own weight. The protruding portion 45 of the document discharge tray 12 engages with the bottom surface rib 46 of the image reading unit 4, as shown in FIG. 18, to maintain the document discharge tray 12 at the prescribed angle in relation to the image reading unit 4.

In the embodiment described above, the recording paper discharge tray 14 is displaced downward when the document discharge tray 12 portion of the covering member contacts the recording paper discharge tray 14. However, it is obvious that the same effects can be achieved if the recording paper discharge tray 14 is displaced downward when the front edge of the image reading unit 4 directly contacts the recording paper discharge tray 14.

In the embodiment described above, a leaf spring was used for the urging member. However, it is also possible to use a coil spring or the like. Further, the recording paper discharge tray 14 is not limited to simply the left and right center of the tray, but can also be supported on both left and right sides of the tray in addition to the center or simply both left and right sides only. Further, the urging member need not contact the underside of the recording paper discharge tray 14, but can instead elastically support the tray by engaging the tray from above. Further, the shape of the protruding portion on the recording paper discharge tray 14 is not limited to a triangular shape. Any shape can be used, providing the protruding portion can oppose the force of the urging member and displace the recording paper discharge tray 14 downward.

According to a multi-functional device 1 as described in the embodiment above, the image reading unit 4 is configured to rotate about the shaft portion 22 in a direction separating the image reading unit 4 from the recording section 5, that is, toward the front of the multi-functional device 1. Accordingly, the image reading unit 4 and recording section 5 can be positioned adjacent to each other during normal operations to achieve a compact construction. When it is necessary to replace the ink cartridge 27 or perform a similar operation on the recording section 5, sufficient space for such operations can be created over the recording section 5 by rotating the image reading unit 4 in a direction away from the recording section 5.

While the invention has been described in detail with reference to specific embodiments thereof, it would be apparent to those skilled in the art that many modifications and variations may be made therein without departing from the spirit of the invention. For example, in the embodiment described above, the document discharge tray 12 is mounted into the image reading unit 4 by fitting the protruding pieces 43 into the depressions 41 from above and engaging the protrusions 44 with the inner walls 42. Further, the protruding portion 45 of the document discharge tray 12 is engaged with the bottom surface rib 46 of the image reading unit 4 in order to maintain the document discharge tray 12 at a prescribed angle. However, it is possible to use another construction, provided the 12 is maintained at the desired angle during operations and allowed to rotate in the direction opposite the rotational direction of the image reading unit 4.

In the embodiments described above, the present invention is applied to a multi-functional device equipped with such functions as a printer function, facsimile function, image scanner function, and copy function, and the cover member is described as an image reading unit. However, the present invention is not limited to this type of device. For example, the same effects can be achieved with an image recording device having only a printer function, wherein the cove member contains no specific function. In addition, the present invention can also apply to a single function device such as a scanner that is provided with a rotatable image reading unit 4.

What is claimed is:
1. A multi-functional device comprising:
an outer casing having a front side, a rear side opposing the front side, and a lower side;
a shaft supported on said outer casing;
a recording section that records images on a recording medium;

a reading section that reads images from a document, said reading section having a front edge substantially in coincidence with the front side of said outer casing, a back edge opposing the front edge, left and right walls, and a lower surface, said reading section being disposed above said shaft and pivotable about said shaft, wherein when said reading section pivots away from said recording section such that said front edge moves forward and downward, a space is provided above said recording section, and said recording section is exposed outside through said space; and a control panel having a front end substantially in coincidence with the front side of said outer casing, a rear end opposing the front end, and a lower surface, wherein said reading section is disposed on the lower surface of said control panel and pivotable together with said control panel, wherein the control panel faces frontward when the space is defined above the recording section.

2. The multi-functional device as claimed in claim 1, wherein said reading section is disposed closer to the front side of said outer casing than said recording section and is pivotable toward the front side of said outer casing.

3. The multi-functional device as claims in claim 1, wherein said shaft is disposed adjacent to said recording section and disposed nearer the front side of said outer casing than said recording section.

4. The multi-functional device as claimed in claim 1, wherein said reading section is pivotable together with said control panel, such that the front end of said control panel moves downward.

5. The multi-functional device as claimed in claim 4, further comprising a document holding section that extends from the rear end of said control panel for supporting documents to be conveyed to said reading section, wherein said document holding section moves together with said reading section, and serves as a cover for covering said recording section when not moved open.

6. The multi-functional device as claimed in claim 1, wherein said recording section comprises an ink-jet-printer provided with an ink cartridge that can be upwardly removed from said ink-jet printer after pivoting said reading section away from said recording section.

7. The multi-functional device as claimed in claim 1, wherein said reading section is disposed adjacent to said recording section and covers at least a portion of said recording section.

8. The multi-functional device as claimed in claim 4, further comprising a document discharge tray pivotally and detachably mounted near the front edge of said reading section for receiving documents discharged from said reading section, wherein said document discharge tray is maintained at a predetermined angle with respect to a direction in which the documents are discharged when in use and is pivotable in a direction opposite the pivoting direction of said reading section.

9. The multi-functional device as claimed in claim 8, further comprising a document discharge tray mounting portion on which said document discharge tray is mounted, wherein said document discharge tray is mounted on said document discharge tray mounting portion from upward.

10. The multi-functional device as claimed in claim 8, further comprising a recording paper discharge tray having an underside, right side and a left side, said recording paper discharge tray being provided on the front end of said outer casing for receiving recording paper discharged from said recording section, said recording paper discharge tray normally slanting upward and being displaced downward due to contact from said reading section when said reading section pivots away from said recording section.

11. The multi-functional device as claimed in claim 10, further comprising an urging member, wherein said recording paper discharge tray is pivotally supported on said outer casing and is supported by said urging member to slant upward.

12. The multi-functional device as claimed in claim 11, wherein said urging member comprises a leaf spring that supports said recording paper discharge tray by contacting the underside of said recording paper discharge tray at a center between the leftside and the rightside.

13. The multi-functional device as claimed in claim 12, wherein said leaf spring is provided beneath said recording paper discharge tray and also beneath an opening formed on the lower side of said outer casing; said recording paper discharge tray comprises a downward protruding portion that contacts said leaf spring via the opening.

14. The multi-functional device as claimed in claim 10, wherein said document discharge tray contacts said recording paper discharge tray when said reading section pivots and rotates in a direction opposite the rotational direction of said reading section into a receded position.

15. A multi-functional device as claimed in claim 14, wherein the reading section and the control panel are pivotable to a location so as not to be disposed vertically over the space.

16. The multi-functional device as claimed in claim 10, wherein said outer casing comprises left and right side covers, between which said reading section is pivotally supported on said shaft; said reading section has left and right walls on which ribs are formed, the ribs being in sliding contact with said left and right side covers at all times, even when said reading section is rotated.

17. The multi-functional device as claimed in claim 16, wherein the back edge of said reading section protrudes above said left and right side covers when said reading section pivots; the ribs comprises linear protrusions extending in a direction nearly parallel to said control panel, such that one portion of the ribs protrudes above said left and right side covers when said reading section pivots.

18. the multi-functional device as claimed in claim 1, wherein said outer casing comprises side frame plates formed with holes; said shaft having two ends and comprises a hollow cylindrical member integrally provide on the lower surface of said reading section and supported via penetration of the two ends through the holes in the side frame plates; and a harness connected to said reading section passes through said hollow shaft and extends externally.

19. The multi-functional device as claimed in claim 18, wherein said shaft has end openings and a circumferential surface formed with an opening in fluid communication with the end openings, and the harness passing through said hollow shaft extends externally via the opening; and surfaces around the end openings are capable of contacting ribs provided on inner walls of said side frame plates.

20. The multi-functional device as claimed in claim 18, wherein stopper members are provided on the left and right walls of said reading section for contacting said side frame plates of said outer casing to position said reading section relative to said outer casing.

21. The multi-functional device as claimed in claim 20, wherein said shaft has a circumferential surface on which protruding portions are provided for interposing said side frame plates of said outer casing between the protruding portions and said stopper members in order to position said reading section relative to said outer casing.

22. A multi-functional device comprising:
an outer casing having a front side, a rear side opposing the front side, and a lower side;
a shaft supported on said outer casing;
a recording section that records images on a recording medium;
a reading section that reads images from a document, said reading section having a front edge substantially in coincidence with the front side of said outer casing, a back edge opposing the front edge, left and right walls, and a lower surface, said reading section being disposed above said shaft and pivotable about said shaft in a manner that said front edge moves forward and downward so as to separate from said recording section, whereby a space is provided above said recording section; and
a control panel having a front end substantially in coincidence with the front side of said outer casing, a rear end opposing the front end, and a lower surface, wherein said reading section is disposed on the lower surface of said control panel and pivotable together with said control panel, wherein
the control panel faces frontward when the space is defined above the recording section.

23. A multi-functional device as claimed in claim 22,
wherein the reading section and the control panel are pivotable to a location so as not to be disposed vertically over the space.

24. A multi-functional device comprising:
an outer casing having a front side, a rear side opposing the front side, and a lower side;
a shaft supported on said outer casing;
a recording section that records images on a recording medium;
a reading section that reads images from a document, said reading section having a front edge substantially in coincidence with the front side of said outer casing, a back edge opposing the front edge, left and right walls, and a lower surface, said reading section being disposed above said shaft and pivotable about said shaft, wherein when said reading section pivots away from said recording section, a space is provided above said recording section, and said recording section is exposed outside through said space, wherein
said shaft is located approximately halfway between the front edge and the back edge, and when said reading section pivots away from said recording section, the front edge moves to a position below said shaft; and
a control panel having a front end substantially in coincidence with the front side of said outer casing, a rear end opposing the front end, and a lower surface, wherein said reading section is disposed on the lower surface of said control panel and pivotable together with said control panel;
wherein, the control panel faces frontward when the space is defined above the recording section.

25. A multi-functional device as claimed in claim 24,
wherein the reading section and the control panel are pivotable to a location so as not to be disposed vertically over the space.

26. A multi-functional device comprising:
an outer casing having a front side, a rear side opposing the front side, and a lower side;
a shaft supported on said outer casing;
a recording section that records images on a recording medium;
a reading section that reads images from a document, said reading section having a front edge substantially in coincidence with the front side of said outer casing, a back edge opposing the front edge, left and right walls, and a lower surface, said reading section being disposed above said shaft and pivotable about said shaft, wherein when said reading section pivots away from said recording section, a space is provided above said recording section, and said recording section is exposed outside through said space; and
a document discharge tray pivotally and detachably mounted on said reading section near the front edge of said reading section for receiving documents discharged from said reading section, wherein said document discharge tray is maintained at a predetermined angle with respect to a direction in which the documents are discharged when in use and is pivotable in a direction opposite the pivoting direction of said reading section, wherein
said document discharge tray initially moves integrally with the pivoting movement of said reading section, and after said document discharge tray has moved integrally with the pivoting movement of said reading section for a predetermined angle, said document discharge tray pivots in a direction opposite the pivoting direction of said reading section as said reading section pivots further.

27. The multi-functional device as claimed in claim 26, wherein said reading section is disposed closer to the front side of said outer casing than said recording section and is pivotable toward the front side of said outer casing.

28. The multi-functional device as claimed in claim 26, wherein said shaft is disposed adjacent to said recording section and disposed nearer the front side of said outer casing than said recording section.

29. The multi-functional device as claimed in claim 26, further comprising a control panel having a front end substantially in coincidence with the front side of said outer casing, a rear end opposing the front end, and a lower surface, wherein said reading section is disposed on the lower surface of said control panel and pivotable together with said control panel, such that the front end of said control panel moves downward.

30. The multi-functional device as claimed in claim 26, wherein said recording section comprises an ink-jet printer provided with an ink cartridge that can be upwardly removed from said ink-jet printer after pivoting said reading section away from said recording section.

31. The multi-functional device as claimed in claim 26, wherein said reading section is disposed adjacent to said recording section and covers at least a portion of said recording section.

32. The multi-functional device as claimed in claim 26, wherein said outer casing comprises side frame plates formed with holes; said shaft having two ends and comprises a hollow cylindrical member integrally provided on the lower surface of said reading section and supported via penetration of the two ends through the holes in the side frame plates and a harness connected to said reading section passes through said hollow shaft and extends externally.

33. A multi-functional device as claimed in claim 26,
wherein the reading section and the control panel are pivotable to a location so as not to be disposed vertically over the space.

* * * * *